United States Patent
Zhang et al.

(10) Patent No.: US 12,078,011 B2
(45) Date of Patent: Sep. 3, 2024

(54) MOTORIZED WINDOW TREATMENT

(71) Applicant: Nien Made Enterprise Co., Ltd., Taichung (TW)

(72) Inventors: You-Yu Zhang, Hsinchu County (TW); Jui-Pin Jao, Miaoli County (TW); Ping-Yu Chu, Hsinchu County (TW); Chao-Hung Nien, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 580 days.

(21) Appl. No.: 17/235,930

(22) Filed: Apr. 20, 2021

(65) Prior Publication Data

US 2021/0238920 A1 Aug. 5, 2021

Related U.S. Application Data

(63) Continuation-in-part of application No. 17/125,961, filed on Dec. 17, 2020.

(30) Foreign Application Priority Data

Dec. 20, 2019 (TW) ................................. 108217046

(51) Int. Cl.
 *E06B 9/322* (2006.01)
 *E06B 9/262* (2006.01)
 *H02P 5/74* (2006.01)
(52) U.S. Cl.
 CPC .............. *E06B 9/322* (2013.01); *E06B 9/262* (2013.01); *H02P 5/74* (2013.01); *E06B 2009/2625* (2013.01)

(58) Field of Classification Search
 CPC ..... E06B 2009/2423; E06B 2009/2441; E06B 2009/2622; E06B 2009/2625;
 (Continued)

(56) References Cited

U.S. PATENT DOCUMENTS 6,283,190 B1 * 9/2001 Hu ............................ E06B 9/32
 160/84.02
6,369,530 B2   4/2002 Kovach
 (Continued)

FOREIGN PATENT DOCUMENTS

EP       3489452 A1 *  5/2019  ............. E06B 9/262
WO  WO-2021123176 A1 *  6/2021  ............. E06B 9/322

*Primary Examiner* — Johnnie A. Shablack
(74) *Attorney, Agent, or Firm* — Winston Hsu

(57) ABSTRACT

A motorized window treatment has a headrail, a first operable rail and a second operable rail, a driving device, a distance detection circuit, a receiving circuit and a motor control circuit. The motor control circuit is coupled with the receiving circuit and the distance detection circuit for configuring the driving device to move the first operable rail and the second operable rail according to the signals received by the receiving circuit. When the receiving circuit receives a command signal to move the second operable rail towards a target position and the first operable rail locates between the second operable rail and the target position, the motor control circuit configures the driving device to move the second operable rail and the first operable rail collectively towards the target position.

13 Claims, 18 Drawing Sheets

(58) Field of Classification Search
CPC ..... E06B 2009/2627; E06B 2009/3222; E06B 2009/6809; E06B 2009/6845; E06B 9/262; E06B 9/30; E06B 9/32; E06B 9/322; E06B 9/68
See application file for complete search history.

(56) References Cited

U.S. PATENT DOCUMENTS

| | | | | |
|---|---|---|---|---|
| 7,063,122 | B2* | 6/2006 | Colson | E06B 9/34 160/245 |
| 8,193,742 | B2* | 6/2012 | Skinner | E06B 9/72 318/16 |
| 8,540,005 | B2* | 9/2013 | Baugh | E06B 9/322 160/310 |
| 8,830,058 | B2* | 9/2014 | Yeh | A47H 5/0325 160/310 |
| 9,334,688 | B2 | 5/2016 | Colson | |
| 9,335,753 | B2* | 5/2016 | Baugh | E06B 9/322 |
| 9,399,888 | B2* | 7/2016 | Colson | E06B 9/68 |
| 10,655,384 | B2* | 5/2020 | Foley | E06B 9/74 |
| 11,035,172 | B2* | 6/2021 | Rieper | E06B 9/322 |
| 11,377,905 | B2* | 7/2022 | Colson | E06B 9/68 |
| 11,448,009 | B2* | 9/2022 | Otsuka | E06B 9/262 |
| 11,486,193 | B2* | 11/2022 | Chiang Huang | E06B 9/322 |
| 2007/0089838 | A1* | 4/2007 | Wetsema | E06B 9/322 160/84.06 |
| 2010/0206492 | A1* | 8/2010 | Shevick | E06B 9/30 160/170 |
| 2012/0200247 | A1* | 8/2012 | Baugh | E06B 9/322 318/468 |
| 2012/0261079 | A1* | 10/2012 | Chambers | E06B 9/68 160/1 |
| 2013/0087296 | A1* | 4/2013 | Mullet | E06B 9/262 160/405 |
| 2016/0017656 | A1 | 1/2016 | Adreon | |
| 2017/0096853 | A1* | 4/2017 | Eubanks, Sr. | E06B 9/322 |
| 2018/0080279 | A1* | 3/2018 | Eubanks, Sr. | E06B 9/38 |
| 2018/0116040 | A1 | 4/2018 | Mann | |
| 2018/0174781 | A1 | 6/2018 | Fangmann | |
| 2021/0238920 | A1* | 8/2021 | Zhang | H02P 23/18 |
| 2022/0085738 | A1* | 3/2022 | Nien | E06B 9/262 |
| 2023/0009409 | A1* | 1/2023 | Lagarde | E06B 9/322 |
| 2023/0019542 | A1* | 1/2023 | Dupielet | E06B 9/322 |
| 2023/0193688 | A1* | 6/2023 | Strand | E06B 9/322 160/84.02 |

* cited by examiner

MOTORIZED WINDOW TREATMENT

CROSS REFERENCE TO RELATED APPLICATIONS

This application is a continuation-in-part of U.S. patent application Ser. No. 17/125,961 filed on Dec. 17, 2020, which claims the benefit of priority to Taiwan patent application No. 108217046 filed on Dec. 20, 2019. The forgoing applications are incorporated herein by reference for all purposes.

BACKGROUND OF THE DISCLOSURE

1. Field of the Disclosure

The present disclosure generally relates to a motorized window treatment, and more particularly to the motorized window treatment having multiple operable rails for configuring window covering materials.

2. Description of the Prior Art

When installed to cover building openings, window coverings can provide specific effects, such as keeping privacy, insulating heat, and blocking light. Typically, a conventional window covering includes a headrail and a covering material; in the headrail, there are usually a spindle, a decelerator, a motor, and a control device. The covering material is located below the headrail, and can be driven through a cord which is connected to the spindle. The decelerator is connected between the spindle and a shaft of the motor. The control device can be used to control the motor, whereby the shaft is able to, through the decelerator and the spindle, drive the covering material to be extended or retracted.

If the covering material is hindered or even pulled downward by someone or some objects during its collapsing or ascending and therefore is unable to rise smoothly, such situation may cause damages to the blocking objects. In addition to this, the force that holds the covering material back will be also transferred to the motor through the spindle, becoming a force exerted on the motor in a direction opposite to its rotating direction. The covering material, the power transmitting mechanism, or even the motor itself may get damaged as a result. On the other hand, while the covering material is expanding (i.e., closing), the motor will not stop operating until receiving a stop command, and therefore the covering material will keep descending even if it bumps into any blocking object. A continuously lowering covering material is possible to damage the blocking object, or, since the bottom of the covering material is obstructed by the blocking object, the covering material is likely to expand or lower unevenly with unbalanced tension, and the rest of the cord which is still wound around the spindle may become misarranged or loose, affecting the smoothness of the operations taken place next time.

In addition, the upper and lower limits corresponding to the complete retracted and extended states of the covering material have to be set up before the window covering is ready to use so that the motor can automatically stop operating when the window covering is fully opened or closed. The conventional way to do the set-up is to manually stop the motor through a control device when the covering material is fully raised or lowered. A position detector connected to the shaft of the motor is then used to detect and collect the location information corresponding to the current states of the window covering, and the location information will be saved in the control device. Once the position detector is rotated to a recorded position information as being concurrently driven by the shaft of the motor, the control device sends out a command to make the motor stop operating. However, this manual way to set up the upper and lower limits requires additional preparation in advance, and the information deviation of the position detector can accumulate after a period of use, leading to imprecise upper and lower limits that have to be recalibrated, which unnecessarily increases the inconvenience of using a window covering.

Moreover, some motorized window treatments have multiple operable rails for configuring window covering materials to perform the required shading effects. If the movements of the operable rails were not handled carefully, the motorized windows treatment may malfunction because the operable rails bump into each other or the cords for moving the operable rails become tangled.

SUMMARY OF THE DISCLOSURE

The present disclosure provides an example embodiment of a motorized window treatment, comprising: a headrail, a first operable rail, a second operable rail, a driving device for moving at least one of the first operable rail and the second operable rail, a distance detection circuit for detecting a distance between the first operable rail and the second operable rail, a receiving circuit for receiving one or more command signals, and a motor control circuit coupled with the distance detection circuit and the receiving circuit for configuring the driving device to move at least one of the first operable rail and the second operable rail according to the one or more command signals received by the receiving circuit; wherein the receiving circuit receives a first command signal to move the second operable rail towards a target position, and the first operable rail locates between the second operable rail and the target position; wherein when a first rail distance between the first operable rail and the second operable rail is greater than a predetermined threshold, the motor control circuit configures the driving device to move the second operable rail towards the target position until a second rail distance between the first operable rail and the second operable rail is substantially equal to the predetermined threshold; wherein when the first rail distance between the first operable rail and the second operable rail is less than or equal to the predetermined threshold, the motor control circuit configures the driving device to move the second operable rail and the first operable rail collectively towards the target position.

The present disclosure further provides another example embodiment of a motorized window treatment, comprising: a headrail, a first operable rail, a second operable rail, a driving device for moving at least one of the first operable rail and the second operable rail, a distance detection circuit for detecting a distance between the first operable rail and the second operable rail, a receiving circuit for receiving one or more command signals, and a motor control circuit coupled with the receiving circuit and the distance detection circuit for configuring the driving device to move at least one of the first operable rail and the second operable rail according to the one or more command signals received by the receiving circuit; wherein when the receiving circuit receives a first command signal to move the second operable rail towards a target position and the first operable rail locates between the second operable rail and the target position, the motor control circuit configures the driving device to move the second operable rail and the first operable rail collectively towards the target position.

Therefore, the operable rails of the motorized window treatment may be moved as required and the tangle of the cords may be avoided. These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be best understood by referring to the following detailed description of some illustrative embodiments in conjunction with the accompanying drawings, in which.

DETAILED DESCRIPTION

Figure 1:
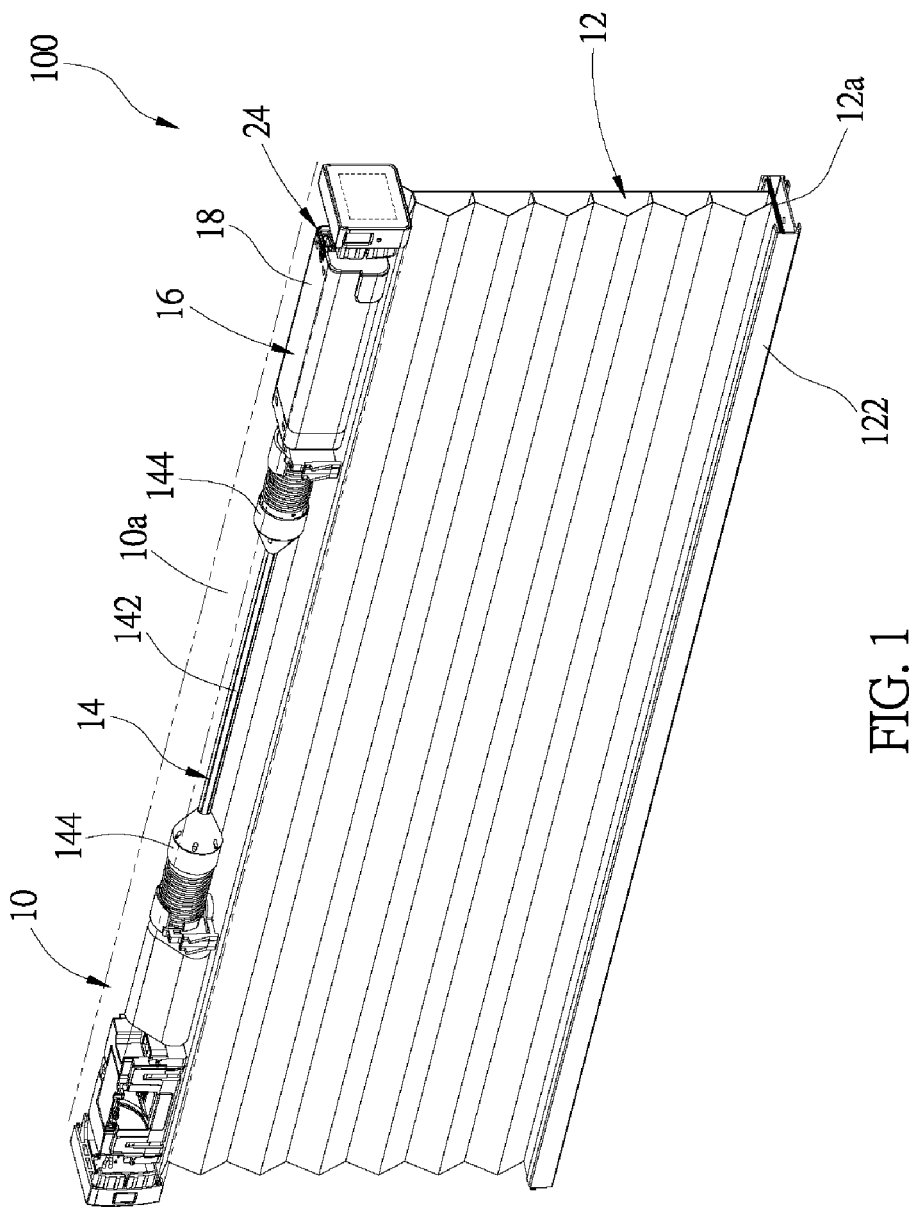
FIG. 1 is a perspective view of the window covering of a first embodiment of the present disclosure.
Figure 2:
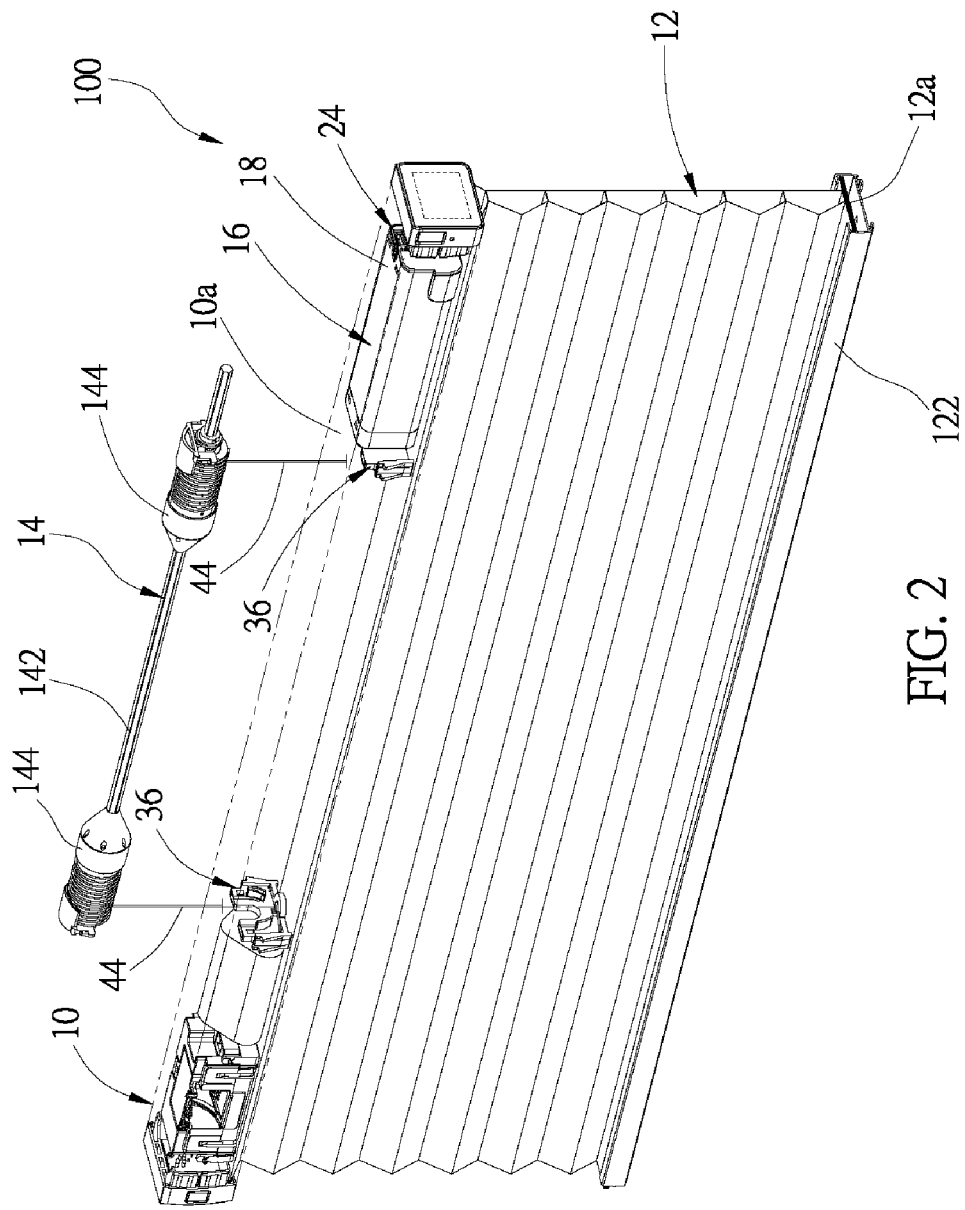
FIG. 2 is a partial exploded perspective view of the window covering of the first embodiment.

A window covering 100 of a first embodiment of the present disclosure is shown in FIG. 1 to FIG. 10 which includes a headrail 10, a covering material 12, a rotating member 14, a driving device 16, and a control device 24.

The headrail 10 is a frame having a receiving space 10a therein. The covering material 12 is located below the headrail 10, and the covering material 12 has a lower end 12a away from the headrail 10.

The rotating member 14 is provided in the receiving space 10a of the headrail 10, and includes a spindle 142 and two spools 144. The spindle 142 extends in a longitudinal direction of the headrail 10. The spools 144 fixedly fit around the spindle 142, and are apart from each other by a certain distance. Each of the spools 144 has a cord 44 wound therearound, wherein an end of each of the cords 44 is fixed at the corresponding one of the spool 144.

Each of the cords 44 passes through a cord hole 102 located on a bottom of the headrail 10, and goes through the covering material 12 in a vertical direction, with another end thereof reaching the lower end 12a of the covering material 12. The lower end 12a of the covering material 12 includes a bottom rail 122, wherein the another ends of the cords 44 are connected to the bottom rail 122. In some embodiments, the number of the spools 144 and the cords 44 are not limited to be two as exemplified above, but could be only one or more than two.

The driving device 16 is provided in the receiving space 10a of the headrail 10, and includes a casing 18, a motor 20, and a decelerator 22, wherein the motor 20 and the decelerator 22 are located in the casing 18. The motor 20 is coupled to the spindle 142 through the decelerator 22, wherein a shaft 202 of the motor 20 is connected to the decelerator 22, and the decelerator 22 is connected to an end of the spindle 142. In an embodiment, the decelerator 22 is a planetary gearing decelerator; however, this is not a limitation of the present disclosure. The motor 20 drives the spindle 142 to rotate, and the spools 144 fixedly fitting around the spindle 142 would be concurrently driven to rotate as well, whereby the spools 144 could release out or reel in the cords 44 to drive the covering material 12 to expand (close) or collapse (open). A length of a segment of each of the cords 44 which can be fully released out from the corresponding spool 144 due to the driving of the motor 20 is slightly longer than a length of the covering material 12 when it is fully expanded or lowered. Understandably, in any embodiments described or implied in the present disclosure, the so mentioned length of the segment of each of the cords 44 released out from the corresponding spool 144 refers to the segment length that each cord 44 gets released out from the respective spool 144 by the driving of the motor 20, not a distance between each of the spools 144 and the lower end 12a of the covering material 12.

The control device 24 is provided in the receiving space 10a of the headrail 10, and is electrically connected to the motor 20, wherein the control device 24 is adapted to control the motor 20 to rotate, whereby to drive the covering material 12 to expand or collapse. Furthermore, the control device 24 would control the motor 20 to stop operating when a moving speed of the lower end 12a of the covering material 12 decreases and such situation lasts for a predetermined time. In this way, when the covering material 12 is expanded to eventually reach a fully expanded (i.e., fully lowered) position, is collapsed to eventually reach a fully collapsed (i.e., fully raised) position, or encounters resistance during its expanding or collapsing, the control device 24 could stop the covering material 12 from moving because the moving speed of the lower end 12a of the covering material 12 would decrease for some time at least equal to or even longer than the predetermined time. Whereby, the covering material 12 could stay in a fully expanded state or a fully collapsed state. In addition, the covering material 12 would not exert further force on the blocking object which it bumps into during the expanding or collapsing process, and the window covering 100 could be prevented from being damaged as well.

In an embodiment, the control device 24 includes a control module 26 and a detecting module 30, wherein the control module 26 controls the motor 20 through a driving circuit 28 to drive the spindle 142 of the rotating member 14 to rotate in a first rotating direction D1 or a second rotating direction D2. When the spindle 142 of the rotating member 14 rotates in the first rotating direction D1, the spools 144 which fixedly fit around the spindle 142 would be driven by the spindle 142 to rotate as well, whereby to reel in the cords 44 and therefore to collapse or retract the covering material 12; when the spindle 142 of the rotating member 14 rotates in the second rotating direction D2, the spools 144 which fixedly fit around the spindle 142 would be driven by the spindle 142 to release out the cords 44, whereby to expand or lower the covering material 12.

The detecting module 30 is electrically connected to the control module 26, and is adapted to detect a rotating speed of the rotating member 14 or of the shaft 202 of the motor 20. While the covering material 12 is being collapsed (i.e., being raised), the control module 26 could, based on the detected rotating speed, determine whether the moving speed of the lower end 12a of the covering material 12 is lower than the moving speed moments ago, and whether such situation lasts for the predetermined time. This way the control module 26 could learn if the covering material 12 has reached the fully collapsed position or if it encounters a blocking object during the process of collapsing. The detecting module 30 could further detect if any of the cords 44 has shifted away from a predetermined position P0, and the result of such detection could be used as an indication. Specifically speaking, if it is detected that at least one of the cords 44 has completely shifted away from the predetermined position P0, the control module 26 would realize that the moving speed of the lower end 12a of the covering material 12 has become lower than the moving speed moments ago, and such situation has lasted at least for the predetermined time. Therefore, the control module 26 could use said indication to determine if the covering material 12 has reached the fully expanded position or if it encounters resistance from a blocking object during the process of expanding or lowering. The control module 26 would control the motor 20 to stop operating if it determines that the covering material 12 is in any of the following circumstances: the covering material 12 has been completely collapsed or raised to reach the fully collapsed position, has been completely expanded or lowered to the fully expanded position, or encounters resistance during the expanding or collapsing process. In an embodiment, the control module 26 could further include a microcontroller to make all kinds of judgments mentioned above. It has to be clarified that the predetermined time mentioned in some embodiments could be defined in the control device 24 as required. However, it should be a sufficient period of time so that the control device 24 could recognize the situation when the moving speed of the lower end 12a of the covering material 12 decreases or even becomes 0.

In the following paragraphs, we are going to explain the mechanism of how to determine if the covering material 12 has been fully collapsed (in other words, fully opened) or if it encounters resistance during the process of collapsing.

Figure 3:
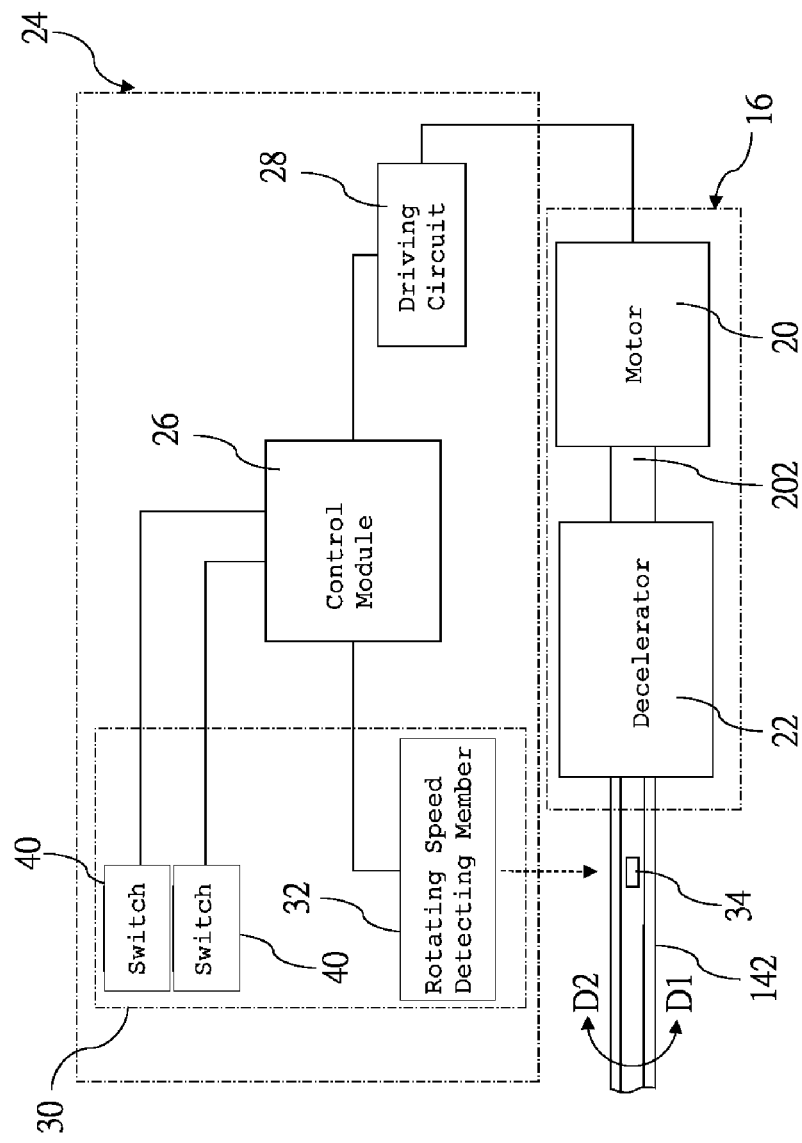
FIG. 3 is a schematic view showing the connection relation of the control device of the first embodiment.

The detecting module 30 includes a rotating speed detecting member 32, which is adapted to measure the rotating speed of the rotating member 14. In an embodiment, the rotating speed detecting member 32 is a Hall sensor, and a magnet 34 is provided on the rotating member 14 as shown in FIG. 3, wherein the magnet 34 is provided on the spindle 142. When the spindle 142 rotates, the rotating speed of the spindle 142 could be measured through the calculation of the changing on the magnetic field induction between the magnet 34 and the rotating speed detecting member 32.

Figure 4:
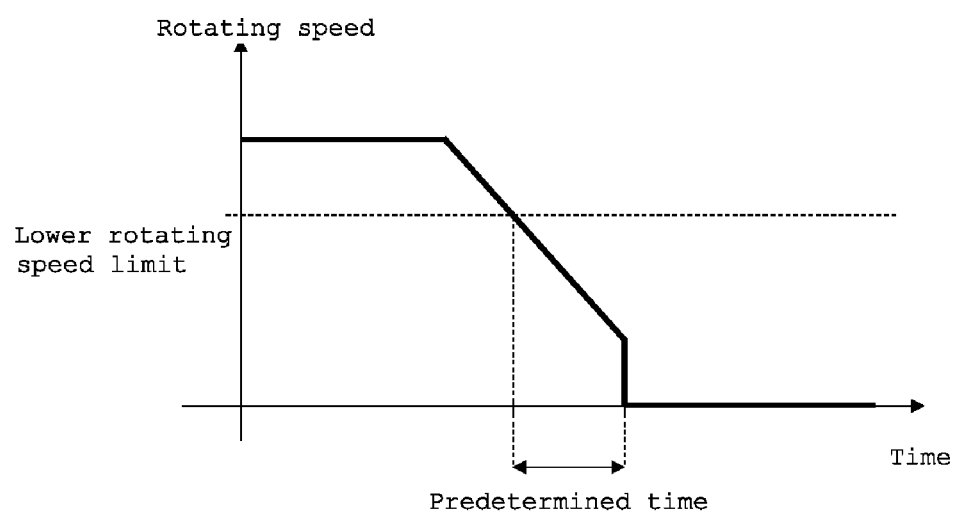
FIG. 4 is a chart showing the relation between the rotating speed of the rotating member of the first embodiment and time.

A lower rotating speed limit for the rotating member 14 could be set in advance in the control module 26, as shown in FIG. 4. When the control module 26 controls the motor 20 to drive the rotating member 14 to rotate in the first rotating direction D1 (i.e., when the covering material 12 is being collapsed or retracted), the control module 26 would receive a signal of the rotating speed measured by the rotating speed detecting member 32. The rotation of the rotating member 14 would be hindered if the covering material 12 has been fully collapsed (retracted or raised) and any parts of the cords 44 which can be wound have already been wound around the spools 144, or if the covering material 12 encounters resistance during the process of collapsing and the resultant pulling and tugging cause the cords 44 unable to be further wound around the spools 144. As a result, the rotating speed of the rotating member 14 would decrease, and therefore the moving speed of the lower end 12a of the covering material 12 which is driven by the rotating member 14 would decrease as well. Once the rotating speed measured by the detecting module 30 is lower than the lower rotating speed limit, and such situation lasts for the predetermined time, the control module 26 would control the motor 20 to stop rotating. Whereby, no matter the covering material 12 is fully collapsed, or bumps into a blocking object during the process of collapsing, the motor 20 would be stopped from operating. If the rotating speed measured by the detecting module 30 returns to a speed higher than the lower rotating speed limit within the predetermined time, the control module 26 would determine that the covering material 12 bumps into a blocking object only for a brief moment, and the moving speed of the lower end 12a of the covering material 12 would not be affected by the blocking object so the covering material 12 would be still able to collapse or retract normally. Therefore, the control module 26 could, through the driving circuit 28, control the motor 20 to keep operating. In an embodiment, the lower rotating speed limit is half of the rotating speed of the motor, and the predetermined time period is 100 ms to 200 ms.

In an embodiment, the magnet 34 could be provided on the spool 144 or the shaft 202 of the motor 20 instead. However, since a rotating speed of the shaft 202 of the motor 20 is higher than the rotating speed of the rotating member 14, in an embodiment that the magnet 34 is provided on the shaft 202 of the motor 20, the lower rotating speed limit should be adjusted to match the rotating speed of the shaft 202 of the motor 20. In other embodiments that the rotating speed detecting member 32 is provided on the shaft 202 of the motor 20, said rotating speed detecting member 32 could be an encoder, a resolver, or any device capable of measuring the rotating speed of the shaft 202 of the motor 20.

In the above paragraphs, we have explained the mechanism of the current embodiment regarding how to determine if the covering material 12 has been fully collapsed, or if it encounters resistance from a blocking object during its process of collapsing. Then, in the following paragraphs, we are going to describe the mechanism of how to determine if the covering material 12 has been fully expanded, or if it encounters resistance from a blocking object during the process of expanding (i.e., while on its way toward the fully expanded position).

Figure 5:
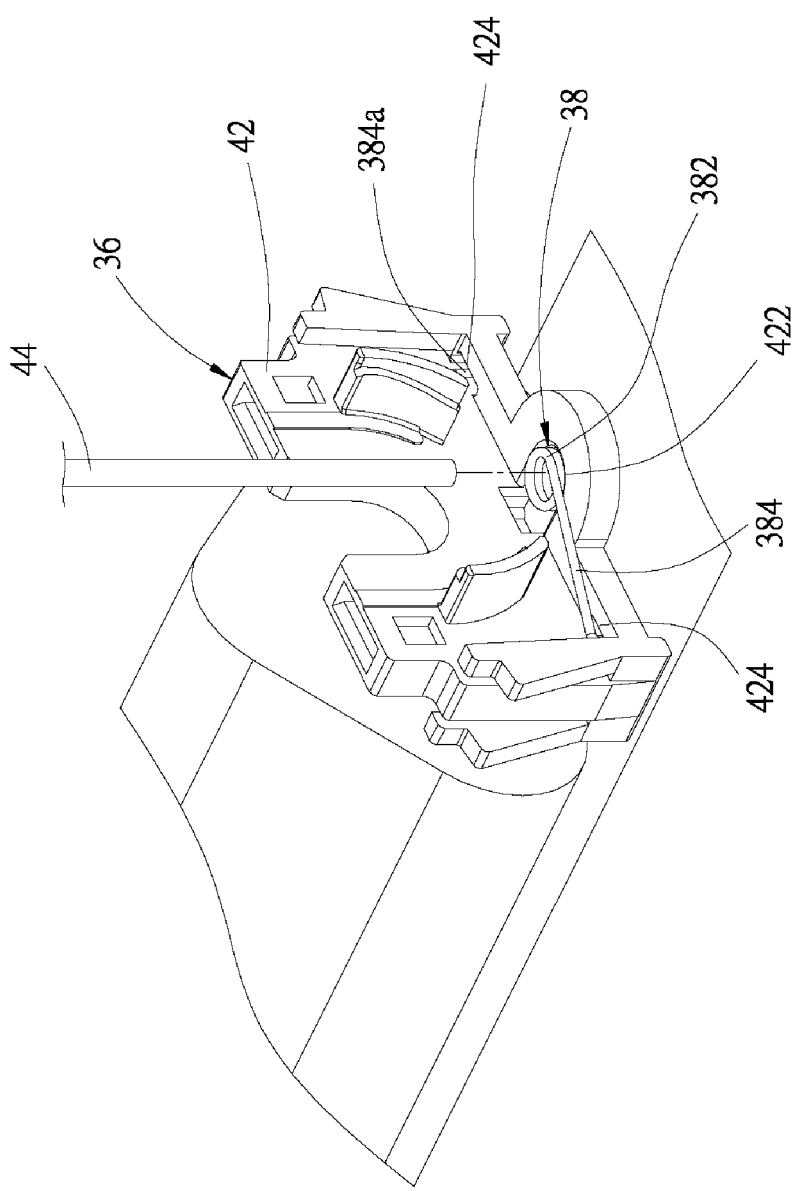
FIG. 5 is a perspective view of the detecting assembly located on the left side of the first embodiment.
Figure 6:
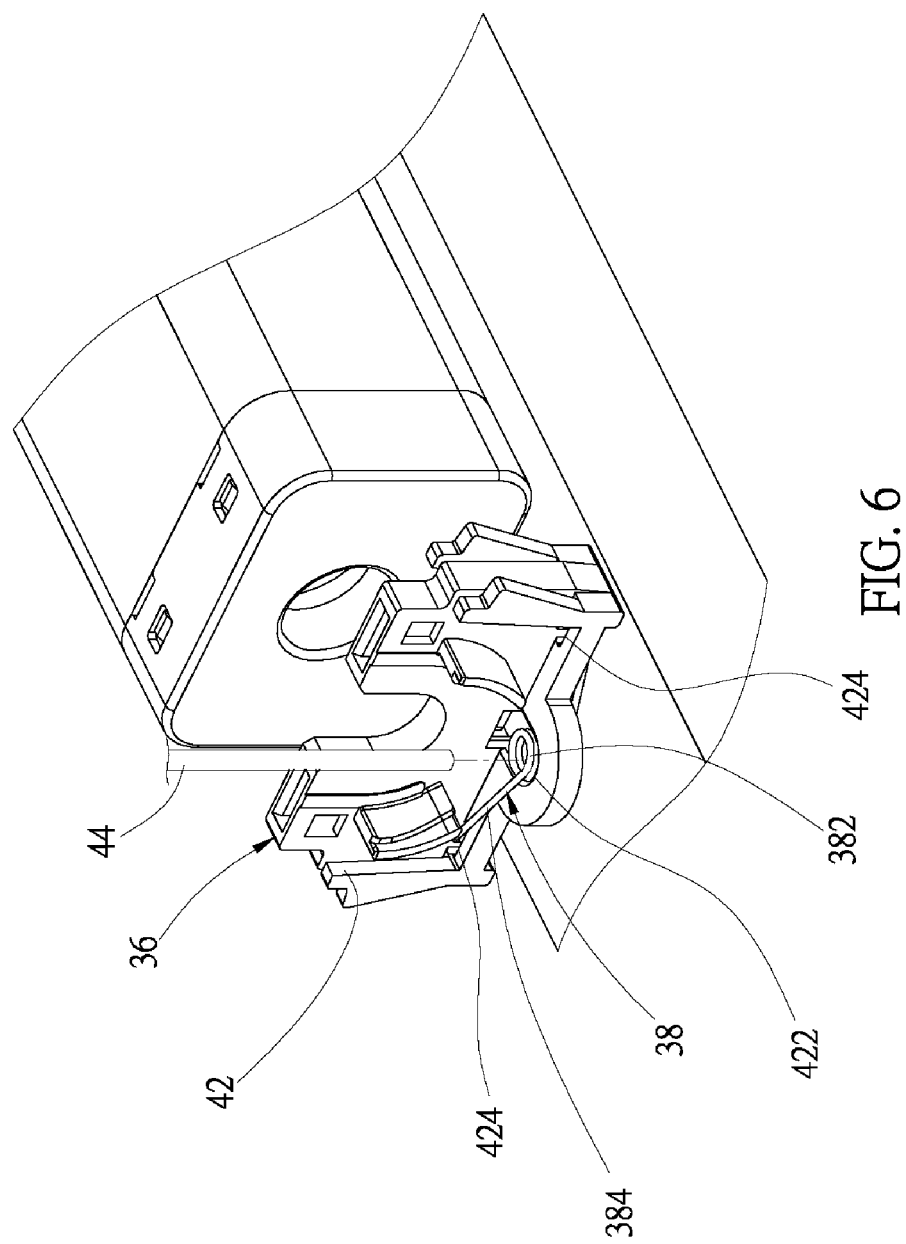
FIG. 6 is a perspective view of the detecting assembly located on the right side of the first embodiment.
Figure 7:
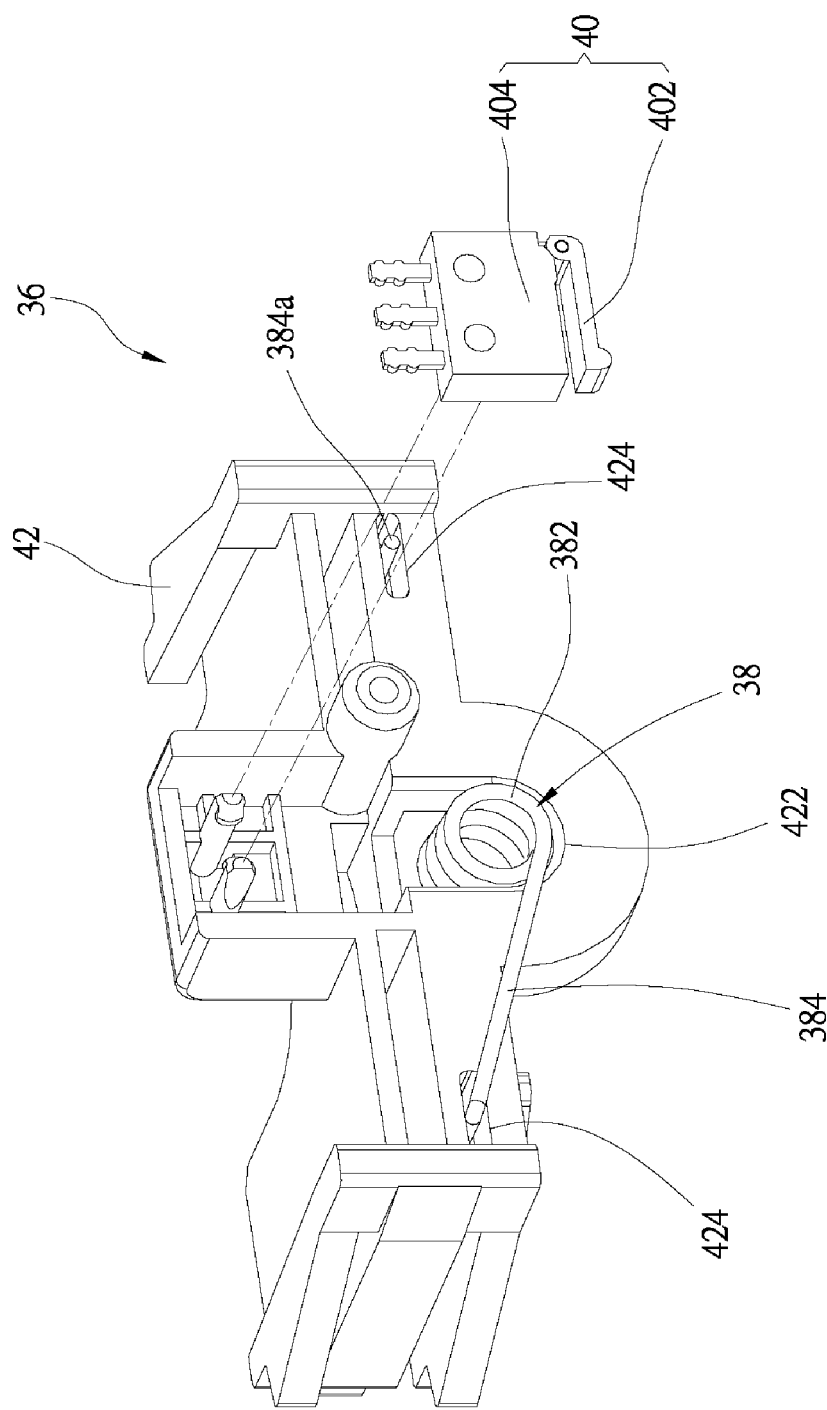
FIG. 7 is an exploded perspective view of the detecting assembly located on the left side of the first embodiment.

As shown in FIG. 1 to FIG. 3, and FIG. 6 to FIG. 9, the detecting module 30 further includes two sets of detecting assemblies 36 provided in a symmetric manner, each of which is respectively located near one of the spools 144 (as shown in FIG. 5 and FIG. 6). Each of the detecting assemblies 36 has the same structure, and we take the detecting assemblies 36 illustrated on the left side of FIG. 5 as an example for explanation hereinafter.

This detecting assembly 36 includes an elastic member, which is a torsion spring 38 as an example, and a switch 40. The torsion spring 38 includes a winding portion 382 and two extending arms 384 connected to the winding portion 382. An end of each of the extending arms 384 has a bent section 384a. The winding portion 382 is located above the cord hole 102 on the left side of the headrail 10, and the cord 44 on this side passes through both the winding portion 382 and the cord hole 102. The winding portion 382 forms a restricting ring which confines the cord 44 in there. The switch 40 has an operation rod 402 and a main body 404, wherein the switch 40 is electrically connected to the control module 26. When the winding portion 382 of the torsion spring 38 is located at an original position (i.e., when it has no external force exerted thereon), it pushes against the operation rod 402 so that the operation rod 402 is forced to contact the main body 404 of the switch 40.

In an embodiment, each of the detecting assemblies 36 further includes a fixing seat 42 which is fixed at the headrail 10, and the torsion spring 38 and the switch 40 are provided on the fixing seat 42. The fixing seat 42 has a receiving hole 422 and two narrow holes 424, wherein the receiving hole 422 is located above the cord hole 102. In a short axial direction of the headrail 10, the receiving hole 422 is located between the two narrow holes 424. A longitudinal direction of each of the narrow holes 424 is parallel to the short axial direction of the headrail 10. The winding portion 382 is located in the receiving hole 422, with the bent section 384a of each of the extending arms 384 going into one of the narrow holes 424. By pulling the winding portion 382 to move in the longitudinal direction of the headrail 10, each of the bent sections 384a could be moved in the longitudinal direction of the respective narrow hole 424.

Figure 8:
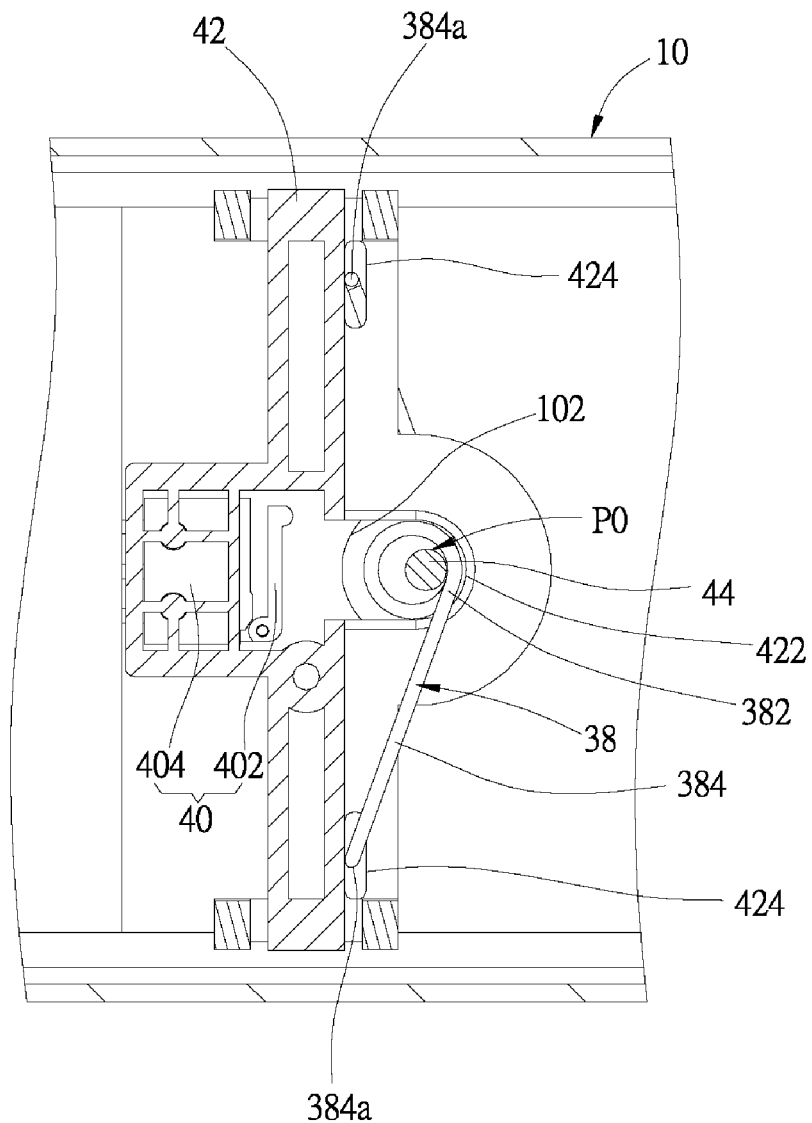
FIG. 8 is a schematic view showing the cord is located at a predetermined position.

As shown in FIG. 8, during the process of extending the covering material 12, an expanded length of the covering material 12 equals to the length of the segment of each of the cords 44 released due to the driving of the motor 20, which means the cords 44 would be taut. At this time, each of the cords 44 is located at the predetermined position P0 in the respective cord hole 102, and exerts a force on the respective winding portion 382 in a direction away from the respective operation rod 402, so that the torsion spring 38 would be forced to leave the original position, accumulating an elasticity. Meanwhile, the main body 404 of the switch 40 is not touched by the operation rod 402, and the control module 26 could control the motor 20 through the driving circuit 28, whereby the rotating member 14 could be rotated in the first rotating direction D1 or the second rotating direction D2, driving the covering material 12 to open or close.

Figure 9:
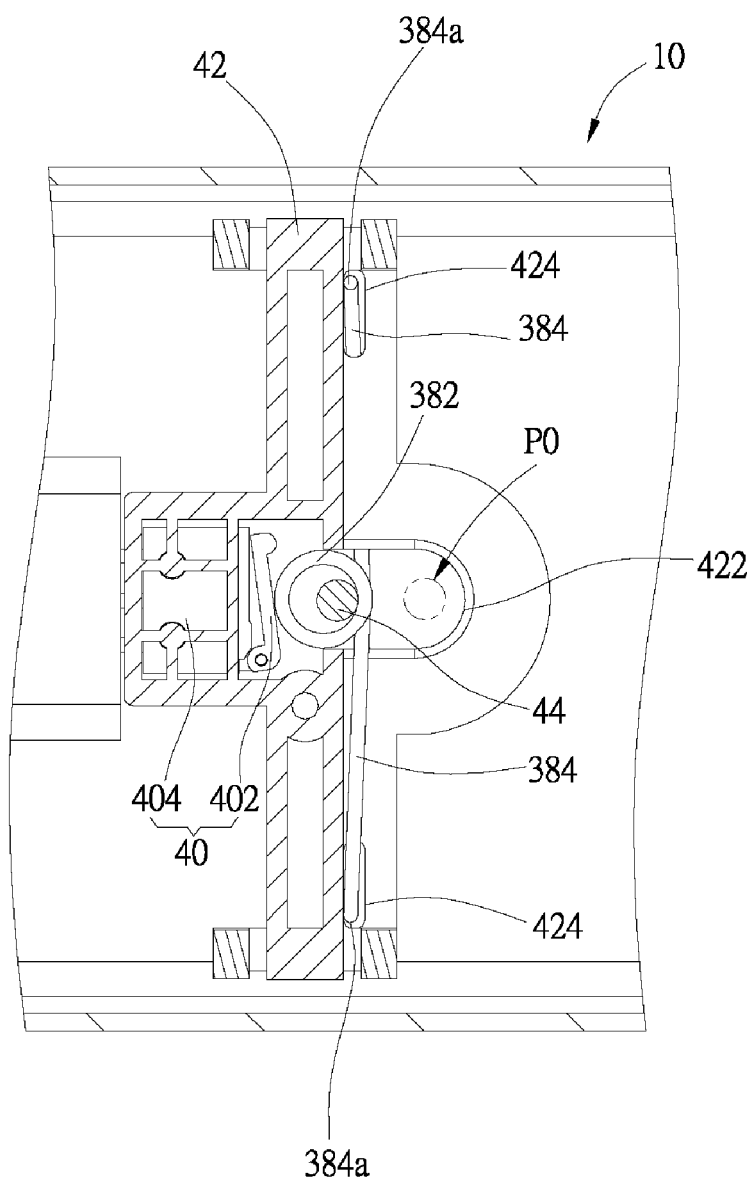
FIG. 9 is a schematic view showing the winding portion of the torsion spring presses the switch.

As shown in FIG. 9, when the covering material 12 is fully expanded and the moving speed of the lower end 12a of the covering material 12 has been decreased to zero, the length of the segment of each of the cords 44 fully released from the respective spool 144 due to the driving of the motor 20 would be slightly longer than the fully expanded length of the covering material 12. As a result, the motor 20 would still drive the cords 44 to be released from the spools 144 at least for the predetermined time (at this time, the moving speed of the lower end 12a of the covering material 12 is zero, and this situation lasts for the predetermined time). When the cords 44 are fully released by the driving of the motor 20, the tension of the cords 44 are no longer stretched by the length of the covering material 12, and therefore would be slack. As a result, the cords 44 would be no longer able to exert force on the winding portions 382, and therefore each of the torsion springs 38 would return to its original position through the accumulated elasticity, driving the corresponding cord 44 to shift and leave its predetermined position P0. Once the torsion springs 38 go back to the original position, the winding portion 382 of each of the torsion springs 38 would press against the corresponding operation rod 402, whereby to trigger the switches 40, making the switches 40 to switch from a first state into a second state, e.g., from an open circuit state to a short circuit state. After the switches 40 are touched and therefore serve as a trigger, the control module 26 would, as responsive to the trigger, control the motor 20 to stop operating. In this way, when the covering material 12 is fully expanded, the motor could stop automatically. When the control module 26 controls the rotation of the motor 20 in a direction of retrieving the covering material 12, the control module 26 would ignore the current state of the switches 40 and reel up the cords 44. When the cords 44 are reeled up by the driving of the motor 20 to a extend that the released length of the cords 44 equals the expanded length of the covering material 12, the cords 44 would drive the lower end 12a of the covering material 12 to move in the direction of collapsing or ascending.

During the process of extending the covering material 12, if the covering material 12 bumps into a blocking object and the moving speed of the lower end 12a of the covering material 12 therefore decreases, the cords 44 would be still released out by the driving of the motor 20, and the moving speed of the lower end 12a of the covering material 12 would decrease (to even zero) for a predetermined time as the cords 44 being released. If the length of the segment of any one of the cords 44 released by the driving of the motor 20 is greater than the current expanded length of the covering material 12, said cord 44 would become loose (i.e., the force exerted by said cord 44 on the corresponding torsion spring 38 would be dismissed), and therefore the corresponding torsion spring 38 would return to its original position, which could drive said cord 44 to shift and leave the predetermined position P0. The torsion spring 38 that returns to its original position would make the winding portion 382 move toward and eventually press against the operation rod 402, whereby to trigger the switch 40. As a result, the switch 40 would be switched from a first state into a second state, e.g., from an open circuit state into a short circuit state. The control module 26 would control the motor 20 to stop operating if any of the switches 40 is triggered, whereby to stop the covering material from expanding or lowering. In this way, the covering material 12 could stop expanding if bumps into a blocking object during its expanding process, and therefore the covering material 12 or the blocking object could be prevented from being damaged.

After the covering material 12 stops moving upon encountering a blocking object during its expanding, if the control module 26 is going to control the motor 20 to rotate in a direction of collapsing or raising the covering material 12, the control module 26 would ignore the current state of the switches 40, and start to reel in the cords 44. When the length of the segment of each of the cords 44 released by the driving of the motor 20 equals the expanded length of the covering material 12, the cords 44 would drive the lower end 12a of the covering material 12 to move in the collapsing direction.

Figure 10:
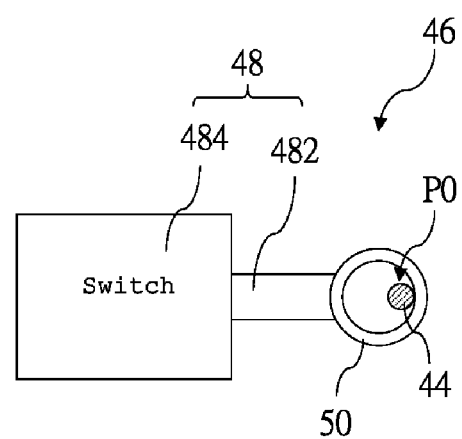
FIG. 10 is a schematic view showing the detecting assembly of a second embodiment of the present disclosure.
Figure 11:
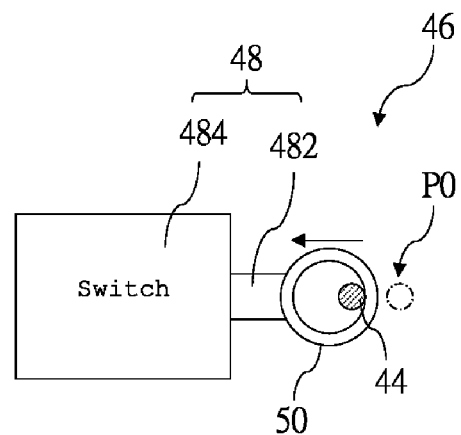
FIG. 11 is a schematic view, showing the operation rod of the switch retreats into the main body.

A detecting assembly 46 of a second embodiment of the present disclosure is shown in FIG. 10 and FIG. 11, which can be also applied to the window covering 100 of the first embodiment. The detecting assembly 46 of the current embodiment includes a switch 48 and a restricting ring 50, wherein the switch 48 has an operation rod 482 and a main body 484. The restricting ring 50 is connected to the operation rod 482, and, on each side, one of the cords 44 passes through the restricting ring 50. When the cord 44 on any given side is taut, said cord 44 is located at the predetermined position P0, and exerts a force to the restricting ring 50 in a direction away from the switch 48. The restricting ring 50 would pull the operation rod 482, forcing the switch 48 to be in a first state (e.g., open circuit). If the lower end 12a of covering material 12 reaches a fully expanded position or bumps into an obstruction, and such situation lasts for a period of time, the cords 44 would become loose since the lengths of the segments of the cords 44 released by the driving of the motor 20 are greater than the expanded length of the covering material. Meanwhile, the force exerted by the cords 44 on the corresponding restricting rings 50 would be dismissed. At this time, an elastic member (not shown) inside the main body 484 of the switch 48 would drive the operation rod 482 to move in an opposite direction, whereby the switch 48 would be in a second state (e.g., short circuit). Furthermore, the restricting ring 50 could pull the cord 44 on the same side to shift and leave the predetermined position P0. The control module 26 would control the motor 20 to stop operating when the switch 40 is in the second state. Whereby, the motor 20 could be stopped from operating when the covering material 12 is fully expanded or when the covering material 12 bumps into an obstruction during the process of expanding.

As mentioned above, through the control device, the window covering provided in the present disclosure could control its motor to stop operating when the moving speed of the lower end of the covering material decreases for a predetermined time. In this way, the motor could be turned off to stop the covering material from further moving in each of the following situations: when the covering material is expanded to the fully expanded position; when the covering material is collapsed to the fully collapsed position; or when the covering material encounters resistance during the process of expanding or collapsing (i.e., while on its way toward the highest or lowest possible positions). With such design, the process and components required for setting up the upper and lower limits could be reduced or even omitted. Furthermore, if the covering material bumps into a blocking object during its movement, it could be prevented from further colliding with the blocking object or getting damaged. In addition, in each of the above-mentioned embodiments, the number of the detecting assemblies of the detecting module is two; however, this is for the purpose of explanation, and in practice, the number of the detecting assemblies could be at least one as well.

Moreover, the control device 24 may be realized according to various design considerations. In another embodiment, when the lower end 12a of the covering material 12 moves and encounters resistance, instead of simply stopping the driving device 16, the control device 24 may further configure the driving device 16 to rotate reversely. For example, if the driving device 16 originally rotates in the second rotating direction D2 and the control device 24 configures the driving device 16 to rotate reversely, the control device 24 configures the driving device 16 to stop and then rotate in the first rotating direction D1. In the process of configuring the driving device 16 to rotate reversely, the control device 24 may explicitly configure the driving device 16 to rotate in a first rotating direction, stop for a human noticeable duration, and then rotate in a second rotating direction. In another embodiment, the control device 24 may also configure the driving device 16 to operate as if the driving device 16 changes the rotating direction without a halt. There is, however, at least a small amount of time, even if human-unnoticeable, in which the rotating speed of the driving device 16 approaches zero and behaves like being stopped. Whether the duration of time that the driving device 16 remains stopped is noticeable by human or not, when referring to the process of rotating the driving device 16 reversely, the driving device 16 is considered to stop from rotating in the previous rotating direction and then rotate in the other direction. Accordingly, the lower end 12a of the covering material 12 is considered to stop from a previous moving direction and then move in the other direction.

When the lower end 12a of the covering material 12 moves downward and encounters resistance, the cords 44 may become loose and tangled, and therefore fail to function properly anymore. In another embodiment, when the lower end 12a of the covering material 12 moves downward and encounters resistance, instead of simply stopping the driving device 16, the control device 24 configures the driving device 16 to rotate reversely. Thus, a suitable length of the cords 44 may be reeled in to the spools 144, and the cords 44 may remain taut as a result. The tangle of the cords 44 and the consequent malfunction can be prevented. The reeled-in length of the cords 44 may be configured to be a predetermined length, a length determined by rotating the driving device 16 for a predetermined time, or dynamically determined by the control device 24. For example, in the process of rotating the driving device 16 reversely, once the state of the switch 40 changes, indicating that the cords 44 are taut, the control module 26 accordingly configures the driving device 16 to stop rotating reversely.

Moreover, the control device 24 may also calculate the position of the lower end 12a of the covering material 12 according to the output of the rotating speed detecting member 32. For example, the rotating speed detecting member 32 detects the rotating direction and the rotating speed of the rotating member 14 and/or the driving device 16 according to information such as the rotating speed (s) of the spindle 142, the spool 144 and/or the output shaft 202 of the motor 20. The control device 24 would be able to calculate the length of the cords 44 released from the headrail 10 based on the rotating direction, the rotating speed, and the rotating time of the rotating member 14 and/or the driving device 16 according to the output (s) of the rotating speed detecting member 32 and/or other component (s) (e.g., an encoder, a resolver, a timer circuit and a memory unit). In addition to the released length of the cords 44, the control device 24 also has the knowledge of the positions of the upper limit and the lower limit of the covering material 12, and therefore can calculate the position of the lower end 12a of the covering material 12.

In another embodiment, when the lower end 12a of the covering material 12 encounters resistance, the position of the lower end 12a of the covering material 12 may incur different problems which require different solutions. The control device 24 may further configure the driving device 16 to rotate reversely for moving the lower end 12a of the covering material 12 for different distances in response to various scenarios. For example, the lower limit of the lower end 12a of the covering material 12 may be configured by a lowermost position of the lower end 12a of the covering material 12 when touch or approach a reference surface position. The reference surface position may be the positions of a sill, a floor, a ground, or other suitable horizontal levels (may be a tilt and/or uneven surface as well). The lower end 12a of the covering material 12 may encounter resistance in the vicinity of the reference surface position due to inaccurate installment, aging of the cords 44 and/or the spool 144, small objects near the reference surface position (e.g., shoes, books and toys), etc. Even if the lower end 12a of the covering material 12 encounters resistance in the vicinity of the reference surface position, the lower end 12a of the covering material 12 should still not move below the lower limit, and therefore, in such circumstances, the cords 44 cannot get loose too much. In this situation, the possibility of the cords 44 getting tangled is lower, so reeling in a smaller length of the cords 44 for moving the lower end 12a of the covering material 12 in the reverse direction for a smaller distance may suffice. Whereas, when the lower end 12a of the covering material 12 encounters resistance at a distance away from the reference surface position, there is more room for the cords 44 to loosen and the probability of tangling the cords 44 is higher. It may, therefore, be better to reeling in a greater length of the cords 44 for moving the lower end 12a of the covering material 12 for a greater distance to prevent the tangle of the cords 44. In the above embodiment, the reference surface position corresponds to physical positions in the real world. In other embodiments, the reference surface position may be configured according to the upper limit of the covering material 12, the lower limit of the covering material 12, the position of the headrail 10, and/or the output of the rotating speed detecting member 32. The control device 24 may therefore configure the driving device 16 to rotate, stop and rotate reversely according to the reference surface position. For example, the control module 26 may configure the reference surface position to be the position where the lower end 12a of the covering material 12 will reach after the driving device 16 rotating for 15 seconds for releasing the lower end 12a of the covering material 12 from the position of the headrail 10. In another embodiment, the control device 24 may be configured to have multiple reference surface positions.

Moreover, since the covering material 12 may be elastic or stretchable to some degree, it might not be easy to precisely detect the distance when the control device 24 configures the lower end 12a of the covering material 12 to move. Therefore, in another embodiment, when the control device 24 configures the lower end 12a of the covering material 12 to move, the distance of the covering material 12 to be moved may be related to the length of the cords 44 to be reeled in by the driving device 16.

Figure 12:
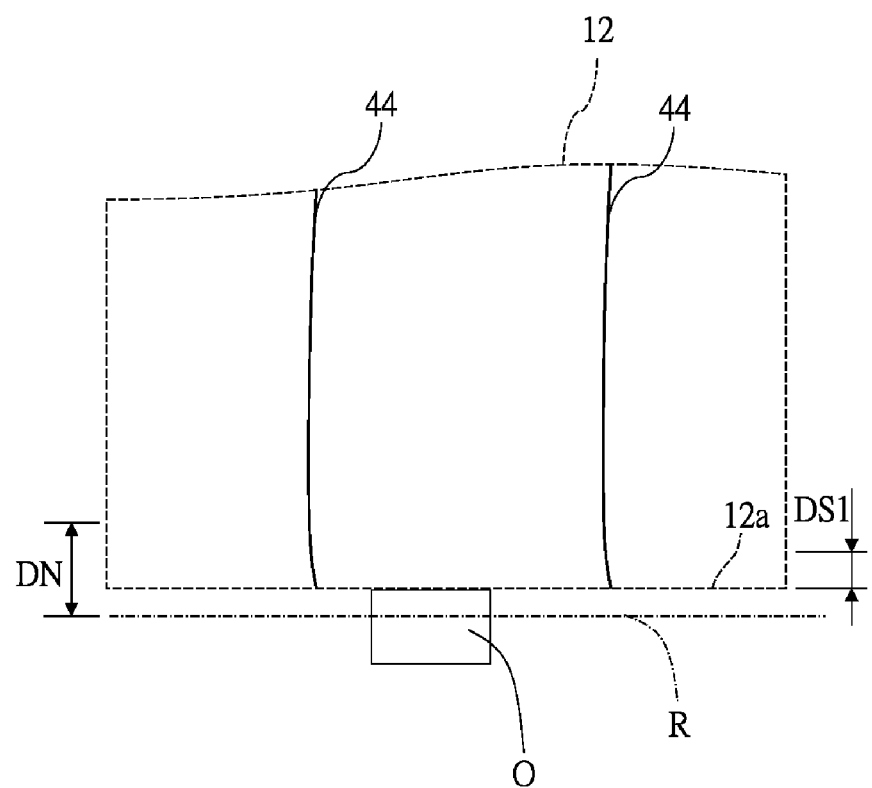
FIG. 12 is a schematic view, showing the situation when the lower end of the covering material encounters resistance at a location within the first predetermined distance.
Figure 13:
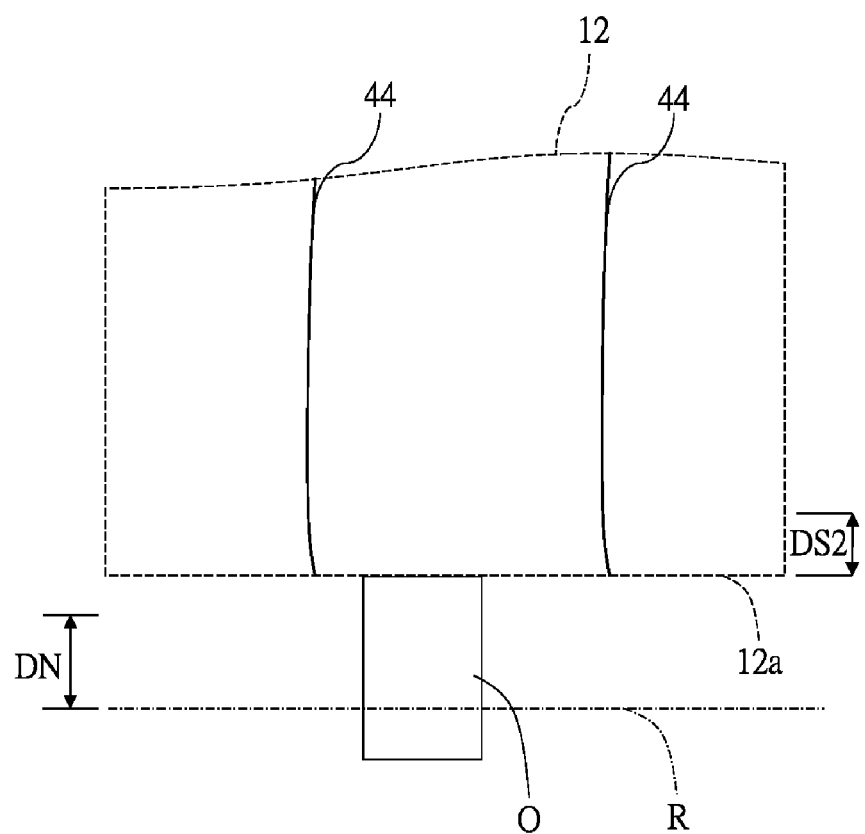
FIG. 13 is a schematic view, showing the situation when the lower end of the covering material encounters resistance at a location out of the first predetermined distance.

In another embodiment, as shown in FIG. 12, when the lower end 12a of the covering material 12 encounters resistance within a first predetermined distance DN measured from the reference surface position R, the control device 24 configures the driving device 16 to reel in the cords 44 for a first length L1 for moving the lower end 12a of the covering material 12 upward for a first distance DS1. On the other hand, as shown in FIG. 13, when the lower end 12a of the covering material 12 encounters resistance at a position out of the first predetermined distance DN measured from the reference surface position R, the control device 24 configures the driving device 16 to reel in the cords 44 for a second length L2 for moving the lower end 12a of the covering material 12 upward for a second distance DS2. In this embodiment, the first length L1 is configured to be smaller than the second length L2, so that the first distance DS1 is smaller than the second distance DS2. Moreover, the first length L1 may also be configured to be greater than or equal to the second length L2 for accommodating different scenarios. In another embodiment, the first length L1 is configured to be greater than the second length L2 for solving another problem. When the lower end 12a of the covering material 12 encounters resistance at a position out of the first predetermined distance measured from the reference surface position, the control device 24 configures the driving device 16 to reel in the cords 44 for the second length L2 for moving the lower end 12a of the covering material 12 upward for a shorter second distance DS2. In this embodiment, the reference surface position and the lengths L1 and L2 may be respectively configured to be different from the counterparts in the previous embodiment. The shorter second length L2 and the shorter second distance DS2 may prevent the lower end 12a of the covering material 12 from bumping into the headrail 10, whereby to avoid unnecessary reactions and/or damages of the components. For example, the power consumption may be lower for not executing unnecessary reactions which may take place when the lower end 12a of the covering material 12 bumps into the headrail 10. Moreover, the control device 24 may configure the driving device 16 to reel in the cords 44 for moving the lower end 12a of the covering material 12 upward for the same distance every time it encounters resistance, or, the control device 24 may also configure the driving device 16 to reel in the cords for moving the lower end 12a of the covering material 12 for a distance which is to be determined depending on the distance between the reference surface position and the position where the lower end 12a of the covering material 12 encounters resistance. For example, if the lower end 12a of the covering material 12 encounters resistance in the vicinity of the reference surface position and the headrail 10, the control device 24 configures the driving device 16 to reel in the cords 44 for moving the lower end 12a of the covering material 12 upward for a shorter distance. On the contrary, if the lower end 12a of the covering material 12 encounters resistance elsewhere, the control device 24 configures the driving device 16 to reel in the cords 44 for moving the lower end 12a of the covering material 12 upward for one or more greater distances.

Moreover, if the control device 24 configures the driving device 16 to move the lower end 12a of the covering material 12 upward for too much distance, a gap may be left or even widened in the vicinity of the reference surface position, allowing light to pass through, which usually bothers the users. In another embodiment, when the lower end 12a of the covering material 12 encounters resistance in the vicinity of the reference surface position, the control device 24 configures the driving device 16 to move the lower end 12a of the covering material 12 upward for a short distance and check whether the state of the switch 40 changes as the cords 44 become taut. The control device 24 iterates the operations of moving the lower end 12a of the covering material 12 upward for a short distance and checking the state of the switch 40 until the switch 40 changes its state to indicate that the cords 44 are taunt or until a predetermined number of iterations are performed. Therefore, the gap caused by moving the lower end 12a of the covering material 12 upward may be eliminated or narrowed.

Moreover, if the lower end 12a of the covering material 12 moves at a high speed when encounters resistance, the rotating speed of the rotating member is high and a large amount of the cords 44 may become loose. The possibility that the cords 44 get tangled and have malfunction may therefore be higher. In another embodiment, the control device 24 configures the driving device 16 to move the lower end 12a of the covering material 12 for different distances according to different rotating speed of the driving device 16 and/or the rotating member 14. When the rotating speed of the driving device 16 and/or the rotating member 14 is lower than a predetermined speed threshold, the control device 24 configures the driving device 16 to reel in the cords 44 for a third length L3 for moving the lower end 12a of the covering material 12 upward for a third distance DS3. When the rotating speed of the driving device 16 and/or the rotating member 14 is higher than the predetermined speed threshold, the control device 24 configures the driving device 16 to reel in the cords 44 for a fourth length L4 for moving the lower end 12a of the covering material 12 upward for a fourth distance DS4. In this embodiment, the third length L3 is configured to be smaller than the fourth length L4, so that the third distance DS3 is smaller than the fourth distance DS4. In another embodiment, the third length L3 may also be configured to be greater than or equal to the fourth length L4 for accommodating different scenarios. Moreover, the control device 24 may also configure the driving device 16 to reel in the cords 44 for moving the lower end 12a of the covering material 12 upward for a distance which is to be determined according to the rotating speed of the driving device 16 and/or the rotating member 14.

Moreover, the above embodiments may be properly combined to accommodate different scenarios. In another embodiment, when the lower end 12a of the covering material 12 encounters resistance within the first predetermined distance measured from the reference surface position, the control device 24 configures the driving device 16 to stop without rotating reversely. When the lower end 12a of the covering material 12 encounters resistance at a position out of the first predetermined distance measured from the reference surface position, the control device 24 configures the driving device 16 to reel in the cords 44 for moving the lower end 12a of the covering material 12 upward for an appropriate distance. In another embodiment, when the lower end 12a of the covering material 12 encounters resistance within the first predetermined distance measured from the reference surface position, the control device 24 configures the driving device 16 to reel in the cords 44 for a fifth length L5 for moving the lower end 12a of the covering material 12 upward for a shorter fifth distance DS5. When the lower end 12a of the covering material 12 encounters resistance at a position out of the first predetermined distance measured from the reference surface position, the control device 24 configures the driving device 16 to reel in the cords 44 respectively for a sixth length L6 and a seventh length L7 for moving the lower end 12a of the covering material 12 upward respectively for a sixth distance DS6 and a seventh distance DS7 according to the rotating speed of the driving device 16 and/or the rotating member 14. Moreover, the sixth length L6 and the seventh length L7 are different but both greater than the fifth length L5. In another embodiment, when the lower end 12a of the covering material 12 encounters resistance and the rotating speed of the driving device 16 and/or the rotating member 14 is higher than the predetermined speed threshold, the control device 24 configures the driving device 16 to move the lower end 12a of the covering material 12 upward. Whereas when the lower end 12a of the covering material 12 encounters resistance and the rotating speeds of the driving device 16 and/or the rotating member 14 is lower than the predetermined speed threshold, the control device 24 configures the driving device 16 to stop.

In the drawings, the motor 20 and the decelerator 22 of the driving device 16 are respectively drawn as a single element for the purposes of conciseness and clear explanation. In the above embodiments, the driving device 16 may also comprise more than one motor and/or more than one decelerator. For example, when the control device 24 configures the driving device 16 to drive the rotating member 14 in the first rotating direction D1, the motor 20 and a first decelerator (not shown in the figures) may be used to drive the rotating member 14 in the first rotating direction D1. Whereas, when the control device 24 configures the driving device 16 to drive the rotating member 14 in the second rotating direction D2, the motor 20 and a second decelerator (not shown in the figures) may be used to drive the rotating member 14 in the second rotating direction D2. In another embodiment, when the control device 24 configures the driving device 16 to drive the rotating member 14 in the first rotating direction D1, a first motor (not shown in the figures) and the decelerator 22 may be used to drive the rotating member 14 in the first rotating direction D1. Whereas, when the control device 24 configures the driving device 16 to drive the rotating member 14 in the second rotating direction D2, a second motor (not shown in the figures) and the decelerator 22 may be used to drive the rotating member 14 in the second rotating direction D2. In another embodiment, when the control device 24 configures the driving device 16 to drive the rotating member 14 in the first rotating direction D1, the first motor and the first decelerator may be used to drive the rotating member 14 in the first rotating direction D1. Whereas, when the control device 24 configures the driving device 16 to drive the rotating member 14 in the second rotating direction D2, the second motor and the second decelerator may be used to drive the rotating member 14 in the second rotating direction D2.

Figure 14:
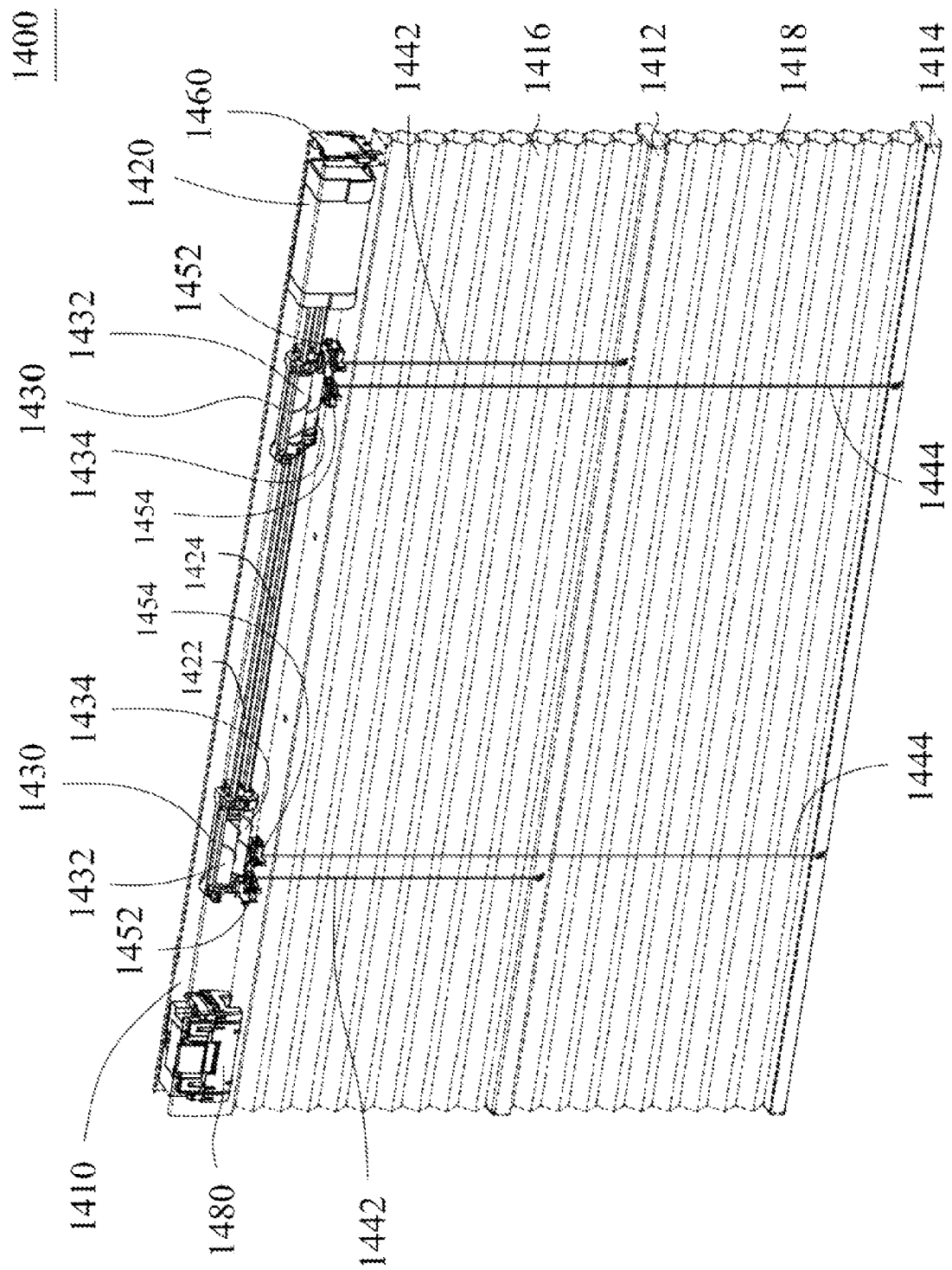
FIG. 14 shows a simplified perspective view of a motorized windows treatment according to another embodiment of the present invention.
Figure 15:
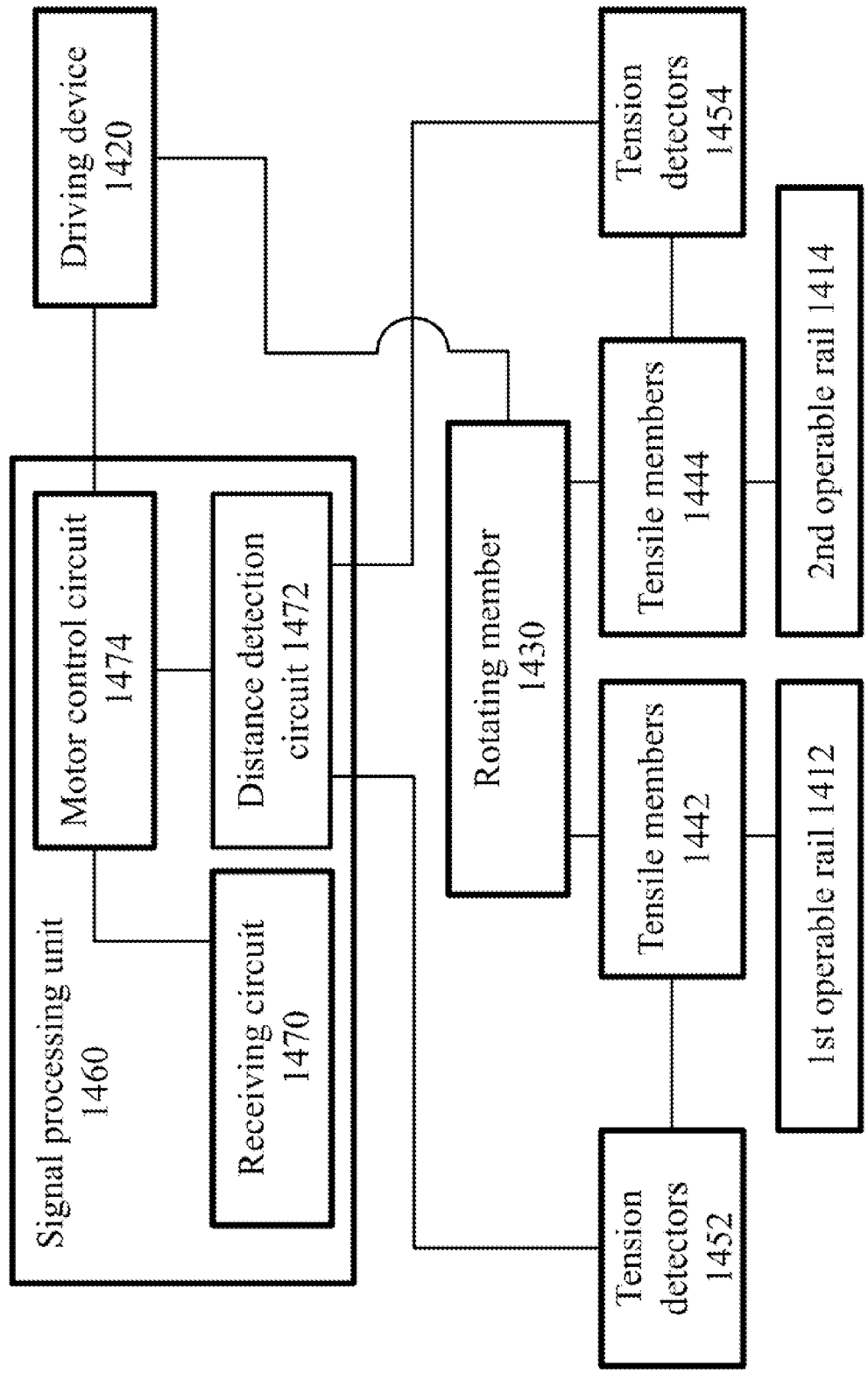
FIG. 15 shows a simplified block diagram of the motorized window treatment in FIG. 14.

FIG. 14 shows a simplified perspective view of a motorized window treatment 1400 according to another embodiment of the present invention. FIG. 15 shows a simplified block diagram of the motorized window treatment 1400. Other components of the motorized window 1400 may not be shown in the figures for the purposes of conciseness and clear explanation.

The motorized window treatment 1400 comprises a headrail 1410, a first operable rail 1412, a second operable rail 1414, a first covering material 1416, a second covering material 1418, a driving device 1420, a rotating member 1430, a set of first-rail tensile members 1442, a set of second-rail tensile members 1444, a set of first-rail tension detectors 1452, a set of second-rail tension detectors 1454, a signal processing unit 1460 and a power supply unit 1480. Some components are not shown in figures, e.g., the wires coupling the power supply unit 1480 and the signal processing unit 1460.

The headrail 1410 is usually configured to be installed at an overhead position of a window frame, a wall or a ceiling. The headrail 1410 may be made of paper, plastic, metal, alloy and/or other suitable materials for accommodating other component (s), e.g., the driving device 1420, the rotating member 1430, the tensile members 1442 and 1444, the tension detectors 1452 and 1454, the signal processing unit 1460 and/or the power supply unit 1480.

In this embodiment, the longitude axes of the headrail 1410, the first operable rail 1412 and the second operable rail 1414 are arranged to be parallel to the window sill, the ground or other suitable surface. The first operable rail 1412 and the second operable rail 1414 are configured to be movable in a direction substantially perpendicular to the longitude axes of the headrail 1410, the first operable rail 1412 and/or the second operable rail 1414. The first operable rail 1412 is configured to be movable between the headrail 1410 and the second operable rail 1414, and the second operable rail 1414 is configured to be movable between the first operable rail 1412 and the lowermost position which the second operable rail 1414 can reach. In this kind of configuration, the first operable rail 1412 and the second operable rail 1414 may also be referred as the middle rail and the bottom rail, respectively. The operable rails 1412 and 1414 may be made of suitable materials (e.g., paper, plastic, metal and alloy). In another embodiment, the operable rails 1412 and 1414 may be also made of a material similar to or the same as the material of the covering material. For example, the covering material comprises cellular-structure fabrics and the operable rail is made of the same fabric with a plurality of cellular structures combined together.

The covering materials 1416 and 1418 may be respectively realized with suitable materials and structures, e.g., cellular shades, pleated shades, roman shades and Venetian shades. In this embodiment, the first covering material 1416 is configured between the headrail 1410 and the first operable rail 1412, and the second covering material 1418 is configured between the first operable rail 1412 and the second operable rail 1414. By adjusting the positions of the first operable rail 1412 and the second operable rail 1414, the covering materials 1416 and 1418 may be respectively expanded, elongated, stretched, retracted, folded and/or collapsed (depending on the structures of the covering materials 1416 and 1418) for providing the required shading effects. Moreover, the covering materials 1416 or 1418 may be optional. For example, in a top-down bottom-up type window treatment, the covering material is configured between the operable rails 1412 and 1414, but no covering material exists between the headrail 1410 and the first operable rail 1412.

The driving device 1420 may comprise one or more motors (not shown in the figures) for providing the required torque and/or the required rotating speed to drive the rotating member 1430. The driving device 1420 may also comprises one or more gear sets and transmission shafts cooperating with the motor(s) to drive the rotating member 1430. In this embodiment, the driving device 1420 comprises two transmission shafts 1422 and 1424 for driving the rotating member 1430.

The rotating member 1430 may comprise one or more spools, pulley wheels, spindles, shafts and/or other suitable components for retracting and releasing the tensile members 1442 and 1444 so as to respectively move the first operable rail 1412 and the second operable rail 1414. The number and the relative positions of the components in the rotating member 1430 may be adjusted according to different design considerations. In this embodiment, the rotating member 1430 comprises four spools for respectively retracting and releasing the tensile members 1442 and 1444. The first set of spools 1442 comprises two spools configured to retract and release the first tensile members 1442. The second set of spools 1444 comprises two spools configured to retract and release the second tensile member 1444.

The tensile members 1442 and 1444 may respectively comprise a single strand or multiple strands of threads, twine, strings, yarn, cords, ropes and/or wires with a suitable tensile strength for moving the operable rails 1412 and 1414. For example, the tensile members 1442 and 1444 may respectively comprise a single strand, twisted strands and/or braided strands of cotton, wool, hemp, paper, synthetic fibers, plastic, leather and/or metal. Moreover, the tensile members may also be realized with telescope rods, pantograph sets, springs, coils and/or other suitable structures for moving the operable rails 1412 and 1414.

In this embodiment, the set of first-rail tensile members 1442 comprises two tensile members, e.g., two cords, coupled between the first operable rail 1412 and the first set of spools 1432 of the rotating member 1430 through the first covering material 1416 and the through holes (not shown in the figures) of the headrail 1410. By driving the first set of spools 1432 of the rotating member 1430 to retract or release the set of first-rail tensile members 1442, the first operable rail 1412 may be moved upward or downward. The set of second-rail tensile members 1444 comprises two tensile members, e.g., two cords, coupled between the second operable rail 1414 and the second set of spools 1434 of the rotating member 1430 through the covering materials 1416 and 1418 and the through holes (not shown in the figures) of the headrail 1410 and the first operable rail 1412. By driving the second set of spools 1434 of the rotating member 1430 to retract or release the set of second-rail tensile members 1444, the second operable rail 1414 may be moved upward or downward. The number of tensile members in the set of first-rail tensile members 1442 may be realized according to the size and/or the weight of the first covering material 1416 and the first operable rail 1412. The number of tensile members in the set of second-rail tensile members 1444 may be realized according to the size and/or the weight of the second covering material 1418 and the second operable rail 1414. For example, the set of first-rail and the set of second-rail tensile members 1442 and 1444 may respectively comprise more than two cords for moving larger covering materials and longer operable rails, and the set of first-rail and the set of second-rail tensile members 1442 and 1444 may comprises different numbers of tensile members. In this embodiment, the two cords of the set of first-rail tensile members 1442 are respectively connected to two positions of the first operable rail 1412 symmetric with respect to the center of gravity of the first operable rail 1412 for balancing the first operable rail 1412. The set of second-rail tensile members 1444 comprises two cords respectively connected to two positions of the second operable rail 1414 symmetric with respect to the center of gravity of the second operable rail 1414 for balancing the second operable rail 1414. In other embodiments, the cords of the tensile members 1442 and/or 1444 are not connected to positions symmetric with respect to the center of gravity of the operable rail, but still connected to positions which can balance the operable rails.

In the embodiment in FIG. 14, the driving device 1420 comprises two motors cooperating with two gear sets and two transmission shafts 1422 and 1424 for driving two set of spools 1432 and 1434 of the rotating member 1430 to respectively retract or release one of the first set and the second set of tensile members 1442 and 1444. In another embodiment, the driving device 1420 may comprise a motor cooperating with a gear set, a transmission shaft and a clutch for alternatively driving the two set of spools of the rotating member 1430 to respectively retract or release the first set or the second set of tensile members 1442 and 1444. The combinations of the motor (s), the gear set (s), the transmission shaft (s), the clutch and the rotating member 1430 may be suitably adjusted according to different design considerations.

The set of first-rail tension detectors 1452 are configured to detect whether the set of first-rail tensile members 1442 is loose or taut. The set of second-rail tension detectors 1454 are configured to detect whether the set of second-rail tensile members 1444 is loose or taut. The set of first-rail tension detectors 1452 and the set of second-rail tension detectors 1454 may respectively comprise one or more detectors for detecting whether one or more tensile members of the sets of the tensile members 1442 and 1444 are loose or taut. For example, the motorized window treatment 1400 may comprise only one tension detector for detecting the tension of either one of the two cords of the tensile members 1442. In this embodiment, when either one of the sets of tensile members becomes loose, the corresponding tension detectors detect the set of tensile members is loose. In other embodiment, when all tensile members in a set of tensile members become loose, the tension detectors detect the set of tensile members is loose. The tension detectors 1452 and 1454 may be realized with the detecting assembly 36 and/or 46 described above, force sensors, optical sensors or other suitable sensing components. The tension detectors 1452 and 1454 may respectively be configured at suitable locations, e.g., the headrail 1410, the operable rails 1412 and 1414, the covering materials 1416 and 1418 and the rotating member 1430.

Please also refer to FIG. 15. In this embodiment, the signal processing unit 1460 comprises a receiving circuit 1470, a distance detection circuit 1472 and a motor control circuit 1474. Some components of the motorized window treatment 1400 are not shown in FIG. 15.

In FIG. 15, the receiving circuit 1470, the distance detection circuit 1472 and the motor control circuit 1474 are illustrated as separate blocks for clear explanation. The functions of the above circuits may be respectively or collectively realized with dedicated hardware circuits, software executed by one or more processors or other suitable combinations of hardware and software. For example, when the functions of the signal processing unit 1460 is realized with a microprocessor, part of the functions of the receiving circuit 1470, the distance detection circuit 1472 and the motor control circuit 1474 may be realized with software executed by the microprocessor and other functions may be realized with integrated and/or discrete circuit components.

The receiving circuit 1470 is configured to receive one or more command signals for adjusting at least one of the first operable rail 1412 and the second operable rail 1414. The command signals may be realized with suitable wired signals and/or wireless signals. The user may use a wired controller, a wireless controller and/or software for configuring the positions of the first operable rail 1412 and the second operable rail 1414. The user may also use voices, gestures, scheduled instructions or other suitable instructions to notify a sensor and/or an agent (e.g., a signal repeater, a gateway, a home automation controller, an intelligent software assistant and a web server) to generate command signals for configuring the positions of the operable rails.

The distance detection circuit 1472 is configured to utilize suitable mechanisms for detecting, calculating and/or indicating the position of the first operable rail 1412, the position of the second operable rail 1414 and/or the distance between the first operable rail 1412 and the second operable rail 1414. For example, the distance detection circuit 1472 may be coupled with the set of first-rail tension detectors 1452, the set of second-rail tension detectors 1454, optical sensors, acoustic sensors, magnetic sensors, accelerometers, gyroscopes, force sensors and/or other suitable sensing components for detecting the distance between the first operable rail 1412 and the second operable rail 1414. In another embodiment, the distance detection circuit 1472 may detect the position of the first operable rail 1412, the position of the second operable rail 1414 and/or the distance between the first operable rail 1412 and the second operable rail 1414 by detecting the operations of the driving device 1420 and/or the rotating member 1430. For example, the motorized window treatment 1400 may comprise an encoder, a resolver, and/or other sensors for detecting the rotating direction, the rotating speed and/or the rotating time of the driving device 1420 and/or the rotating member 1430, e.g., the transmission shafts 1422 and 1424, the spools 1432 and 1434, the gear set(s) and the motor(s). Accordingly, the distance detection circuit 1472 may know the lengths of the tensile members 1442 and 1444 retracted or released by the motor(s) and therefore may know the position of the first operable rail 1412, the position of the second operable rail 1414 and/or the distance between the first operable rail 1412 and the second operable rail 1414.

The motor control circuit 1474 is coupled with the receiving circuit 1470 and the distance detection circuit 1472. The motor control circuit 1474 may configure the driving device 1420 to drive the rotating member 1430 to move the first operable rail 1412 and/or the second operable rail 1414 according to the command signals received by the receiving circuit 1470 and/or the output of the distance detection circuit 1472.

The power supply unit 1480 may be coupled with the power grid and/or comprise one or more batteries (not shown in the figures). The power supply unit 1480 may provide power to the driving device 1420, the signal processing unit 1460, the tension detectors 1452 and 1454, and/or other components (if the above-mentioned components are powered by electricity).

Figure 16:
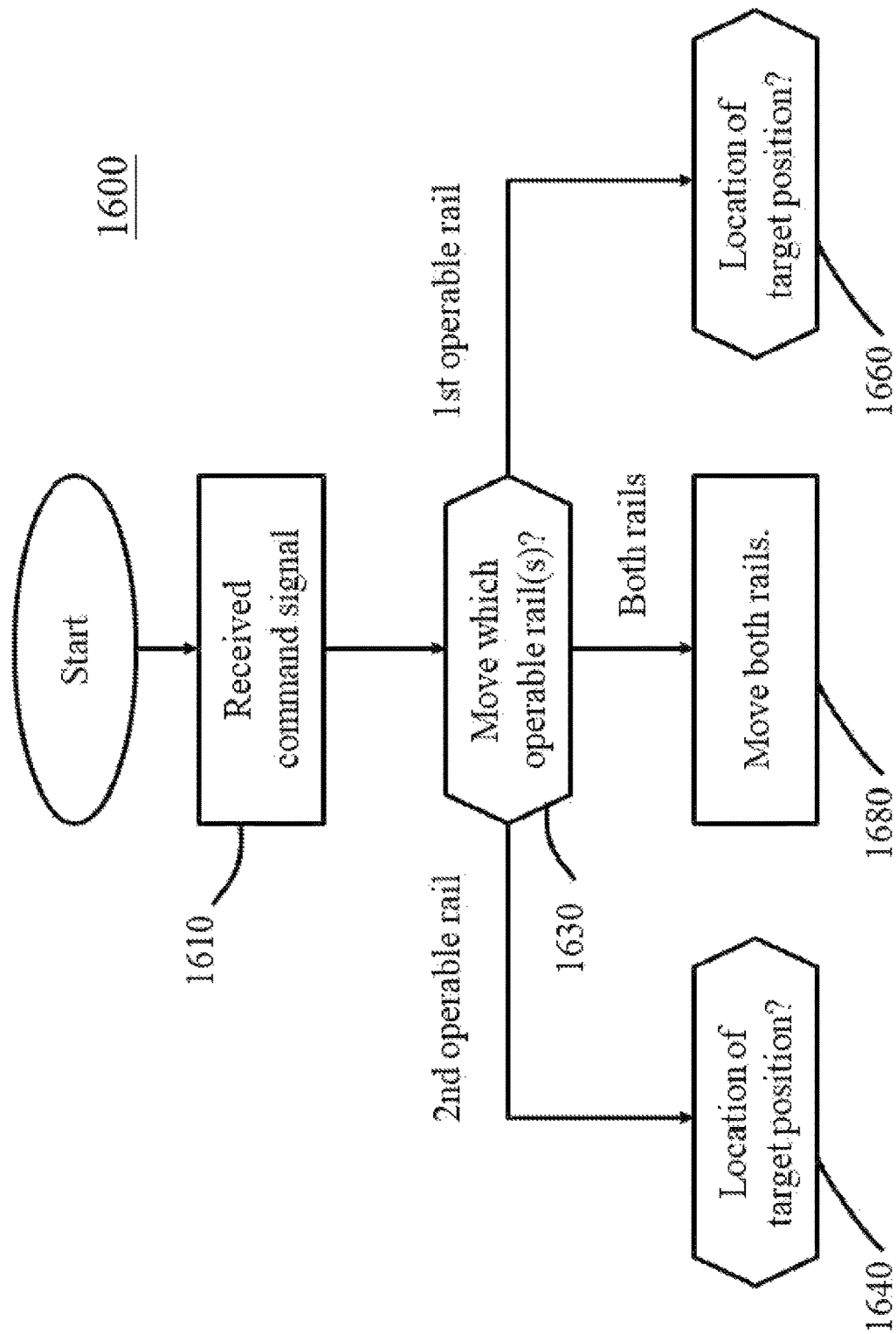
FIGS. 16-18 collectively show a simplified flowchart of a method for moving operable rails of the motorized window treatment in FIG. 14 according to one embodiment of the present invention.
Figure 17:
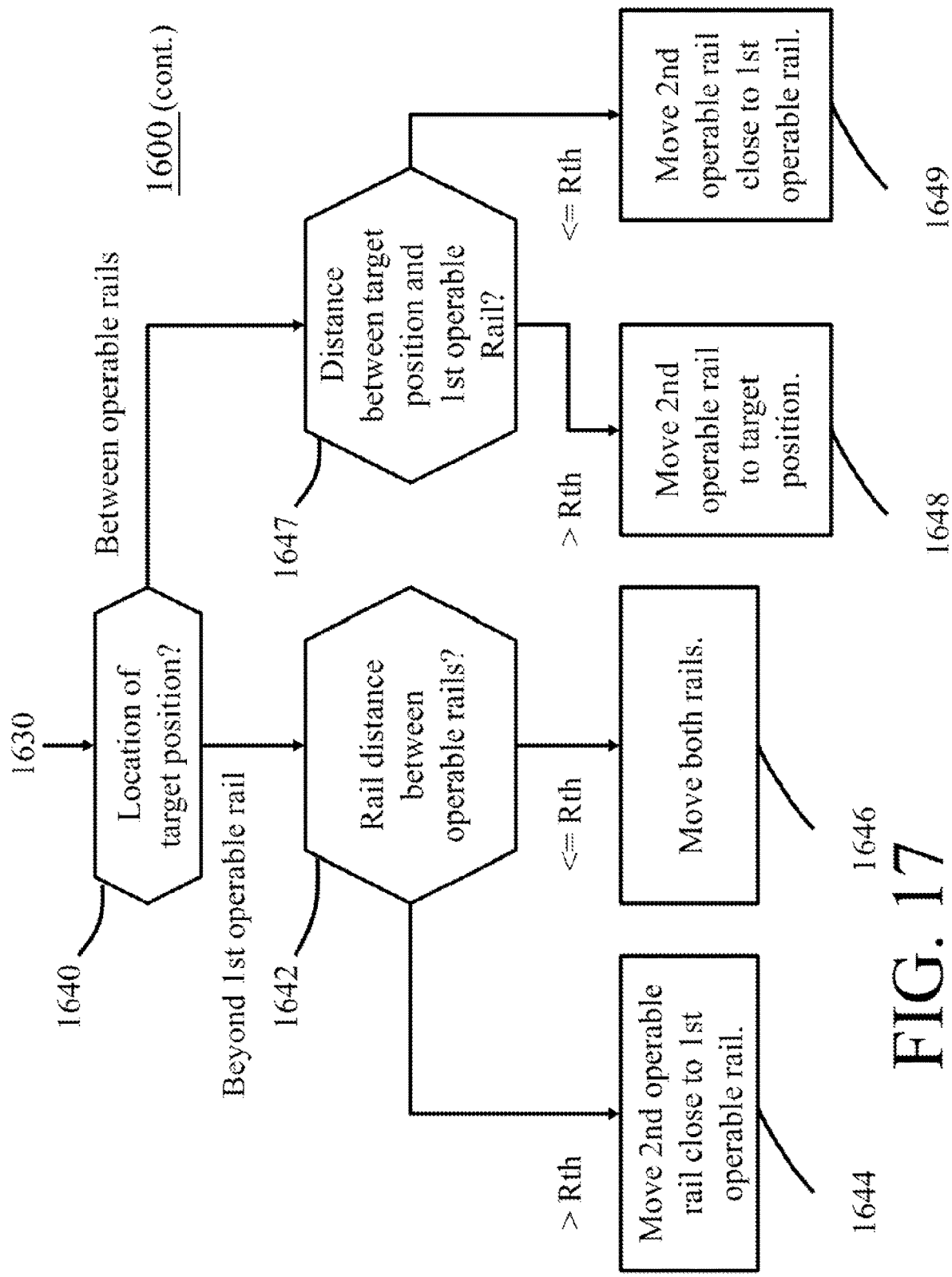
Figure 18:
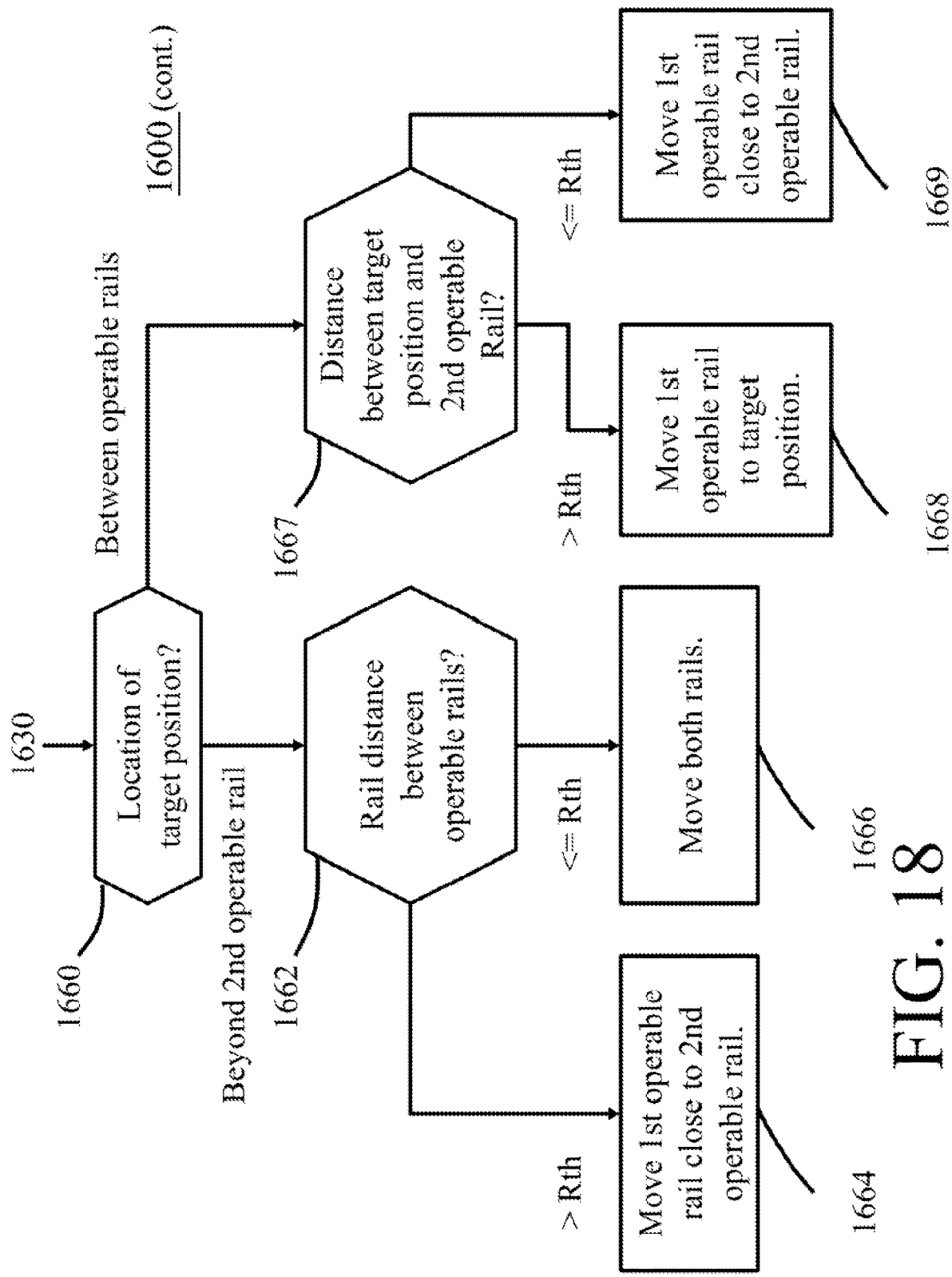

FIGS. 16-18 collectively show a simplified flowchart of a method 1600 for moving the operable rails of the motorized window treatment 1400 according to one embodiment of the present invention. Moreover, the motorized window treatment 1400 is also capable of performing other operations which are not shown in the figures.

In step 1610, the receiving circuit 1470 received one or more command signals for moving the operable rail (s) of the motorized window treatment 1400.

In step 1630, the motor control circuit 1474 decodes the received command signals and analyzes the decoded signal (s) to determine which operable rail (s) to be moved. Moreover, the decoded signal (s) may also comprise other information, e.g., a target position intended for the operable rail and the moving speed of the operable rail. When the second operable rail 1414 should be moved, the method proceeds to step 1640. When the first operable rail 1412 should be moved, the method proceeds to step 1660. When both the operable rails 1412 and 1414 are to be moved, the method proceeds to step 1680.

In step 1640, when the second operable rail 1414 is designated to be moved to a first target position, the motor control circuit 1474 determines the relative positions between the first target position, the first operable rail 1412 and the second operable rail 1414 according to the output of the distance detection circuit 1472. When the first target position locates beyond the first operable rail 1412 (i.e., the first operable rail 1412 locates between the first target position and the second operable rail 1414), the method proceeds to step 1642. When the first target position locates between the two operable rails 1412 and 1414, the method proceeds to step 1647.

In step 1642, the motor control circuit 1474 determines how the second operable rail 1414 should be moved according to a first rail distance between the first operable rail 1412 and the second operable rail 1414. When the first rail distance is greater than a predetermined threshold Rth, the method proceeds to step 1644. When the first rail distance is less than or equal to the predetermined threshold Rth, the method proceeds to step 1646. The distance between the first operable rail 1412 and the second operable rail 1414 may be calculated in advance or dynamically according by the distance detection circuit 1472.

In step 1644, the motor control circuit 1474 configures the driving device 1420 to drive the rotating member 1430 to move the second operable rail 1414 towards the first target position until a second rail distance between the first operable rail 1412 and the second operable rail 1414 is substantially equal to the predetermined threshold Rth (e.g., equal to or slightly less than Rth).

In step 1646, the motor control circuit 1474 configures the driving device 1420 to drive the rotating member 1430 to move the second operable rail 1414 and the first operable rail 1412 collectively towards the first target position.

By referring to "moving the first operable rail 1412 and the second operable rail 1414 collectively towards a target position", the first operable rail 1412 may be moved first, the second operable rail 1414 may be moved first or the two operable rails may be moved at substantially the same time towards the target position. Moreover, the two operable rails 1412 and 1414 may be moved at the same speed or different speeds towards the target position. For example, the first operable rail 1412 and the second operable rail 1414 may be moved at the same time towards the target position at the same speed. In another embodiment, the first operable rail 1412 may be moved before the second operable rail 1414 and moved at a speed faster than, slower than or equal to the second operable rail 1414. In another embodiment, the second operable rail 1414 may be moved before the first operable rail 1412 and moved at a speed slower than to the first operable rail 1412 so that the two operable rails 1412 and 1414 will not bump into each other. In another embodiment, the second operable rail 1414 will not be moved until the first operable rail 1412 has been moved to a suitable distance away from the second operable rail 1414 so that the two operable rails 1412 and 1414 will not bump into each other.

In step 1647, the motor control circuit 1474 determines whether the distance between the first target position and the first operable rail 1412 is greater than the predetermined threshold Rth according to the output of the distance detection circuit 1472. When the distance between the first target position and the first operable rail 1412 is greater than the predetermined threshold Rth, the method proceeds to step 1648. When the distance between the first target position and the first operable rail 1412 is less than or equal to the predetermined threshold Rth, the method proceeds to step 1649.

In step 1648, the motor control circuit 1474 configures the driving device 1420 to drive the rotating member 1430 to move the second operable rail 1414 to the first target position.

In step 1649, the motor control circuit 1474 configures the driving device 1420 to drive the rotating member 1430 to move the second operable rail 1414 towards the first target position until a third rail distance between the first operable rail 1412 and the second operable rail 1414 is substantially equal to the predetermined threshold Rth. In step 1649, the second operable rail 1414 might not reach the first target position.

In step 1660, when the first operable rail 1412 is designated to be moved to a second target position, the motor control circuit 1474 determines the relative positions between the second target position, the first operable rail 1412 and the second operable rail 1414 according to the output of the distance detection circuit 1472. When the second target position locates beyond the second operable rail 1414 (i.e., the second operable rail 1414 locates between the second target position and the first operable rail 1412), the method proceeds to step 1662. When the second target position locates between the two operable rails 1412 and 1414, the method proceeds to step 1667.

In step 1662, the motor control circuit 1474 determines how the first operable rail 1412 should be moved according to a fourth rail distance between the first operable rail 1412 and the second operable rail 1414. When the fourth rail distance is greater than the predetermined threshold Rth, the method proceeds to step 1664. When the fourth rail distance is less than or equal to the predetermined threshold Rth, the method proceeds to step 1666. The distance between the first operable rail 1412 and the second operable rail 1414 may be calculated in advance or dynamically by the distance detection circuit 1472.

In step 1664, the motor control circuit 1474 configures the driving device 1420 to drive the rotating member 1430 to move the first operable rail 1412 towards the second target position until a fifth rail distance between the first operable rail 1412 and the second operable rail 1414 is substantially equal to the predetermined threshold Rth.

In step 1666, the motor control circuit 1474 configures the driving device 1420 to drive the rotating member 1430 to move the first operable rail 1412 and the second operable rail 1414 collectively towards the second target position.

In step 1667, the motor control circuit 1474 determines whether the distance between the second target position and the second operable rail 1414 is greater than the predetermined threshold Rth. When the distance between the second target position and the second operable rail 1414 is greater than the predetermined threshold Rth, the method proceeds to step 1668. When the distance between the second target position and the second operable rail 1414 is less than or equal to the predetermined threshold Rth, the method proceeds to step 1669.

In step 1668, the motor control circuit 1474 configures the driving device 1420 to drive the rotating member 1430 to move the first operable rail 1412 to the second target position.

In step 1669, the motor control circuit 1474 configures the driving device 1420 to drive the rotating member 1430 to move the first operable rail 1412 towards the second target position until a sixth rail distance between the first operable rail 1412 and the second operable rail 1414 is substantially equal to the predetermined threshold Rth. In step 1669, the first operable rail 1412 may not reach the second target position.

In step 1680, the motor control circuit 1474 configures the driving device 1420 to drive the rotating member 1430 to move the first operable rail 1412 and the second operable rail 1414 collectively towards a third target position. Depending on the relative positions between the third target position, the first operable rail 1412 and the second operable rail 1414, the operable rails 1412 and 1414 may be moved in the same direction or different directions (e.g., when the third target position locates between the two operable rails). Moreover, the motor control circuit 1474 may keep the distance between the first operable rail 1412 and the second operable rail 1414 to be greater than the predetermined threshold Rth while moving the operable rails.

According to the method 1600 described above, the positions of the operable rails 1412 and 1414 may be adjusted to configure the covering materials 1416 and 1418 to perform the required shading effects. In one embodiment, the second operable rail 1414 stays at the lowermost position, and the first operable rail 1412 stays halfway between the headrail 1410 and the second operable rail 1414. A user may utilizes a remote controller to send a first command signal to move the second operable rail 1414 to a first target position, e.g., a position near the headrail 1410. In this embodiment, the first operable rail 1412 locates between the second operable rail 1414 and the first target position. When a first rail distance between the first operable rail 1412 and the second operable rail 1414 is greater than the predetermined threshold Rth, the motor control circuit 1474 configures the driving device 1420 to drive the rotating member 1430 to move the second operable rail 1414 towards the first target position until a second rail distance between the first operable rail 1412 and the second operable rail 1414 is substantially equal to the predetermined threshold Rth. Preferably, the second operable rail 1414 is configured to stay at a position at which the second rail distance between the first operable rail 1412 and the second operable rail 1414 is exactly equal to the predetermined threshold Rth. In another embodiment, it is also acceptable if the second operable rail 1414 is configured to stays at a position at which the second rail distance between the first operable rail 1412 and the second operable rail 1414 is slightly less than the predetermined threshold Rth as long as the first tensile members 1442 still remain taut. Therefore, the first tensile members 1442 will not become loose and tangled because of the movement of the second operable rail 1414. Afterwards, when the receiving circuit 1470 receives a second command signal to move the second operable rail 1414 towards the first target position and the second rail distance between the first operable rail 1412 and the second operable rail 1414 is less than or equal to the predetermined threshold Rth, the motor control circuit 1474 configures the driving device 1420 to move the two operable rails 1412 and 1414 collectively towards the first target position. Moreover, when the operable rails 1412 and 1414 are moved to the vicinity of the first target position, e.g., a position near the headrail 1410 or near the lowermost position, a third rail distance between the operable rails 1412 and 1414 may be configured to be less than the second rail distance. Therefore, the operable rails may be configured to stay closer at certain positions for better aesthetics effects.

In another embodiment, when the first rail distance between the first operable rail 1412 and the second operable rail 1414 is less than or equal to the predetermined threshold Rth, the receiving circuit 1470 receives the first command signal to move the second operable rail 1414 towards the first target position and the first operable rail 1412 locates between the second operable rail 1414 and the first target position. In this situation, the motor control circuit 1474 configures the driving device 1420 to move the operable rails 1412 and 1414 collectively towards the first target position.

In the specification and in the claim, the ordinal numbers are utilized to clearly explain the embodiments and not to represent a sequential order of the components. For example, the middle rail in the motorized window treatment 1400 may also be referred as the second operable rail while the bottom rail in the motorized window treatment 1400 is referred as the first operable rail.

In the above embodiments, the receiving circuit 1470 may also receive command signals while the operable rail is being moved. In one embodiment, the second command signal is received after the motor control circuit 1474 has finished moving the second operable rail 1414 according to the first command signal. Thus, the motor control circuit 1474 continues executing the operations of the second command signal. In another embodiment, the second command signal is received while the motor control circuit 1474 is moving the second operable rail 1414 according to the first command signal. The motor control circuit 1474 may continue executing the operations of the second command signal after finishing the operations of the first command signal. In another embodiment, the motor control circuit 1474 may also stop the current operations of the first command signal and start to execute the operations of the second command signal.

In the above embodiment, when the motor control circuit 1474 is moving the operable rails, the distance between the first operable rail 1412 and the second operable rails 1414 should be maintained at a safe distance to prevent the tensile members 1442 and/or 1444 from becoming loose and tangled. The predetermined threshold Rth described above may be configured to be the shortest safe distance between the first operable rail 1412 and the second operable rails 1414, which the tensile members 1442 and 1444 still remain taut. The distance detection circuit 1472 may determine the predetermined threshold Rth according to the detection results of the tension detectors 1452 and 1454. The predetermined threshold Rth may also be determined by the distance detection circuit 1472 according to the outputs of encoders, resolvers and/or other suitable sensing components from detecting the operations of the driving device 1420 and/or the rotating member 1430.

In the above embodiments, the distance detection circuit 1472 may use one or more suitable mechanisms to dynamically determine the position of the first operable rail 1412, the position of the second operable rail 1414, the distance between the operable rails 1412 and 1414, and/or the predetermined threshold Rth. In one embodiment, the distance detection circuit 1472 utilizes the detection result of the set of first-rail tension detectors 1452 to determine whether the distance between the operable rails 1412 and 1414 is less than or equal to the predetermined threshold Rth. While the second operable rail 1414 is being moved towards the first target position and approaches the first operable rail 1412, the second operable rail 1414 and the second covering material 1418 push the first operable rail 1412. When the first operable rail 1412 is pushed away from its original position, the set of first-rail tensile members 1442 become loose and the set of first-rail tension detectors 1452 accordingly detects the set of first-rail tensile members 1442 becomes loose. When the set of first-rail tension detectors 1452 detect the set of first-rail tensile members 1442 turns from taut to loose, the distance detection circuit 1472 determines the distance between the first operable rail 1412 and the second operable rail 1414 is less than or equal to the predetermined threshold Rth. Accordingly, the motor control circuit 1474 configures the driving device 1420 to stop moving the second operable rail 1414.

In the above embodiments, the distance detection circuit 1472 may also use one or more suitable mechanisms to calculate the position of the first operable rail 1412, the position of the second operable rail 1414, the distance between the operable rails 1412 and 1414, and/or the predetermined threshold Rth in advance. For example, by utilizing a suitable sensing mechanism and algorithms, the distance detection circuit 1472 may have the knowledge of the positions of the operable rails and/or the distance between the operable rails before receiving command signals. The distance detection circuit 1472 may also detects the positions of the operable rails and/or the distance between the operable rails after receiving command signals. In another embodiment, when the receiving circuit 1470 receives the first command signal for moving the second operable rail 1414 towards the first target position, the distance detection circuit 1472 already has the knowledge of the distance between the operable rails 1412 and 1414 is greater than the predetermined threshold Rth. The motor control circuit 1474 may accordingly configures the driving device 1420 to drive the rotating member 1430 to move the second operable rail 1414 towards the first target position until the second operable rail 1414 reaches a calculated position. When the second operable rail 1414 stays at the calculated position, the distance between the first operable rail 1412 and the second operable rail 1414 is less than or equal to the predetermined threshold Rth. The calculated position may be determined by the distance detection circuit 1472 according to the moving speed of the second operable rail 1414, the thickness of the second covering material 1418, the distance between the two operable rails, a relative position between the second operable rail 1414 and a reference surface position (e.g., the ground), and/or other suitable parameters. Moreover, the positions of the operable rails, the distance between the operable rails before receiving command signals, the calculated position and other useful information may be detected and calculated in advance, and then stored in a memory unit by the distance detection circuit 1472. The distance detection circuit 1472 and the motor control circuit 1474 may use the stored information in the process of moving the operable rails.

In the specification and in the claim, when an operable rail is moved towards a target position, it may mean the operable rail is designated to move to the target position or the operable rail is being moved in the direction towards the target position without knowing its final destination. The motorized window treatment 1400 may be configured to have one or more target positions which may be respectively configured to be at any suitable position, e.g. at a halfway position between the headrail 1410 and the window sill. For example, the first target position may be configured to a position nearest to the headrail 1410 and the second target position may be configured to be a farthest position away from the headrail 1410. Moreover, the target position may be a predetermined fixed position or configurable by the user. The target position may also be configured in various manners. For example, pressing a "Lowest" button of the remote controller may represent the target position for the second operable rail 1414 is the lowermost position, and consequently the motor control circuit 1474 moves the second operable rail 1414 towards the target position. The target position may also vary dynamically. For example, every time a "downwards" button of the remote controller is pressed, the updated target position for the second operable rail 1414 is configured to be 20 centimeters lower than the previous target position of the second operable rail 1414.

In the above embodiments, the motorized window treatment 1400 may also be configured to perform only part of the operations of the method 1600 according to different design considerations. For example, step 1680 may be omitted if there is no instruction designated to move both operable rails. In another embodiment, step 1666 may be omitted if the first operable rail 1412 is not allowed to be moved beyond the second operable rail 1414. In another embodiment, when the second operable rail 1414 is configured to be moved to the first target position while the first operable rail 1412 locates between the first target position and the second operable rail 1414, regardless of the first rail distance is greater than or less than the predetermined threshold Rth, the motor control circuit 1474 may also configured the first operable rail 1412 and the second operable rail 1414 to be collectively moved towards the first target position. Moreover, the motor control circuit 1474 may configure the driving device 1420 to move the second operable rail 1414 towards the target position and close to the first operable rail 1412, and then move the second operable rail 1414 and first operable rail 1412 collectively towards the target position. The executing order of the operations in the method 1600 may also be adjusted according to different design considerations. Moreover, the above embodiments may also be applied when moving the first operable rail 1412.

When the second operable rail 1414 is being moved towards the first target position and approaches the first operable rail 1412, the first operable rail 1412 may be pushed away from its original position. The set of first-rail tensile members 1442 may become loose and tangled, and/or the users may not like the first operable rail 1412 deviates from its original position. In the above embodiments, the calculated position and/or the predetermined threshold Rth may be determined by the distance detection circuit 1472 according to the speed of the second operable rail 1414, the thickness of the second covering material 1418, the distance between the two operable rails, the distance between the second operable rail 1414 and a reference surface position, and/or other suitable parameters. Accordingly, when the second operable rail 1414 is being moved towards the first target position and stops at the calculated position, the first operable rail 1412 will not be substantially moved. Moreover, the same procedures may also be applied when moving the first operable rail 1412 so that the second operable rail 1414 is not substantially moved when moving the first operable rail 1412.

In the above embodiment, when the second operable rail 1414 approaches the first operable rail 1412, the set of first-rail tensile members 1442 may become loose. In another embodiment, to prevent the tensile members from becoming loose and tangled, when the second operable rail 1414 is being moved towards the first target position and the set of first-rail tension detectors 1452 detect the set of first-rail tensile members 1442 becomes loose, the motor control circuit 1474 configures the driving device 1420 to drive the first set of spools 1432 of the rotating member 1430 to retract a suitable length of the set of first-rail tensile members 1442 so that the set of first-rail tensile members 1442 may become taut. In another embodiment, when the second operable rail 1414 is being moved towards the first target position and the set of first-rail tension detectors 1452 detect the set of first-rail tensile members 1442 becomes loose, the motor control circuit 1474 configures the driving device 1420 to move the second operable rail 1412 away from the first target position for a suitable distance so that the set of first-rail tensile members 1442 may become taut. In another embodiment, to prevent the tensile members from becoming loose and tangled, when the first operable rail 1412 is being moved towards the second target position and the set of first-rail tension detectors 1452 detect the set of first-rail tensile members 1442 becomes loose, the motor control circuit 1474 configures the driving device 1420 to retract a suitable length of the set of first-rail tensile members 1442 so that the set of first-rail tensile members 1442 may become taut. In another embodiment, when the first operable rail 1412 is being moved towards the second target position and the set of first-rail tension detectors 1452 detect the set of first-rail tensile members 1442 becomes loose, the motor control circuit 1474 configures the driving device 1420 to move the second operable rail 1412 towards the second target position for a suitable distance so that the set of first-rail tensile members 1442 may become taut.

In the above embodiments, the operable rails 1412 and 1414 of the motorized window treatment 1400 are configured to be movable in a direction perpendicular to the longitude axes of the headrail 1410 and/or the operable rails. The above methods for moving the operable rails may also be implemented in other types of window treatments. In the embodiments of vertical style window treatments, the longitude axes of the operable rails are configured to be perpendicular to the longitude axis of the headrail. The operable rails are movable in a direction parallel to the longitude axis of the headrail 1410 and/or perpendicular to the longitude axes of the operable rails. For example, the operable rails may be movable in the horizontal directions for receiving or extending the covering material configured between the operable rails. The above methods may still applicable for moving the operable rails in the vertical style window treatment with suitable modifications.

One skilled in the art appreciates that a component may be referred to as different names. This disclosure does not intend to distinguish between components that differ in name but not in function. In the description and in the claims, the term "comprise" is used in an open-ended fashion, and means "include, but not limited to." The terms "coupled with," "couples with," and "coupling with" are intended to compass any indirect or direct connection. Accordingly, if this disclosure mentioned that a first device is coupled with a second device, it means that the two devices may be directly or indirectly connected through electrical connections, wireless communications, optical communications, or other signal connections with/without other intermediate devices or connection means. The term "and/or" may comprise any and all combinations of one or more of the associated listed items. In addition, the singular forms "a," "an," and "the" herein are intended to comprise the plural forms as well, unless the context clearly indicates otherwise. Other embodiments of the invention will be apparent to those skilled in the art from consideration of the specification and practice of the invention disclosed herein. It is intended that the specification and embodiments are considered as exemplary only, with a true scope and spirit of the invention indicated by the following claims.

It must be pointed out again that the embodiments described above are only some embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A motorized window treatment, comprising:
   a headrail, a first operable rail and a second operable rail,
   a driving device for moving at least one of the first operable rail and the second operable rail,
   a distance detection circuit for detecting a distance between the first operable rail and the second operable rail,
   a receiving circuit for receiving one or more command signals, and
   a motor control circuit coupled with the distance detection circuit and the receiving circuit for configuring the driving device to move at least one of the first operable rail and the second operable rail according to the one or more command signals received by the receiving circuit;
   wherein the receiving circuit receives a first command signal to move the second operable rail towards a target position located on one side of the first operable rail opposite to where the second operable rail is located, after which when the motor control circuit is configured to determine that a first rail distance between the first operable rail and the second operable rail is greater than a predetermined threshold, the motor control circuit configures the driving device to move the second operable rail towards the target position until a second rail distance between the first operable rail and the second operable rail is substantially equal to the predetermined threshold, and when the motor control circuit is configured to determine that the first rail distance between the first operable rail and the second operable rail is less than or equal to the predetermined threshold, the motor control circuit configures the driving device to move the second operable rail and the first operable rail at substantially the same time towards the target position.

2. The motorized window treatment of claim 1, further comprising:
   a set of first-rail tensile members coupled with the driving device and the first operable rail, and
   a first-rail tension detector coupled with the distance detection circuit for detecting whether the set of first-rail tensile members is loose or taut;
   wherein when the second operable rail is being moved towards the first operable rail and the first-rail tension detector detects the set of first-rail tensile members turns from taut to loose, the motor control circuit accordingly is configured to determine that the second rail distance between the first operable rail and the second operable rail is less than or equal to the predetermined threshold.

3. The motorized window treatment of claim 2, wherein when the motor control circuit is configured to determine that the second rail distance between the first operable rail and the second operable rail is less than or equal to the predetermined threshold, the motor control circuit further configures the driving device to retract the set of first-rail tensile members until the first-rail tension detector detects the set of first-rail tensile members becomes taut.

4. The motorized window treatment of claim 2, wherein when the motor control circuit is configured to determine that the second rail distance between the first operable rail and the second operable rail is less than or equal to the predetermined threshold, the motor control circuit further configures the driving device to move the second operable rail away from the target position until the first-rail tension detector detects the set of first-rail tensile members becomes taut.

5. The motorized window treatment of claim 1, further comprising:
   a set of second-rail tensile members coupled with the driving device and the second operable rail, and
   a second-rail tension detector coupled with the distance detection circuit for detecting whether the set of second-rail tensile members is loose or taut;
   wherein when the second operable rail is being moved towards the first operable rail and the second-rail tension detector detects the set of second-rail tensile members turns from taut to loose, the motor control circuit accordingly is configured to determine that the second rail distance between the first operable rail and the second operable rail is less than or equal to the predetermined threshold.

6. The motorized window treatment of claim 5, wherein when the motor control circuit is configured to determine that the second rail distance between the first operable rail and the second operable rail is less than or equal to the predetermined threshold, the motor control circuit further configures the driving device to move the first operable rail towards the target position until the second-rail tension detector detects the set of second-rail tensile members becomes taut.

7. The motorized window treatment of claim 5, wherein when the motor control circuit is configured to determine that the second rail distance between the first operable rail and the second operable rail is less than or equal to the predetermined threshold, the motor control circuit further configures the driving device to retract the set of second-rail tensile members until the second-rail tension detector detects the set of second-rail tensile members becomes taut.

8. The motorized window treatment of claim 1, wherein when the motor control circuit is configured to determine that the first rail distance between the first operable rail and the second operable rail is greater than the predetermined threshold, the second operable rail is moved towards the target position until reaching a calculated position at which the second rail distance between the first operable rail and the second operable rail is substantially equal to the predetermined threshold, and when the second operable rail has been moved to and stops at the calculated position, the receiving circuit receives a second command signal to move the second operable rail towards the target position, the motor control circuit configures the driving device to move the second operable rail and the first operable rail at substantially the same time towards the target position.

9. The motorized window treatment of claim 8, further comprising:
a set of first-rail tensile members coupled with the driving device and the first operable rail, and
a first-rail tension detector coupled with the distance detection circuit for detecting whether the set of first-rail tensile members is loose or taut;
wherein while the second operable rail is being moved to the calculated position, the set of first-rail tensile members remains taut.

10. The motorized window treatment of claim 8, further comprising:
a set of second-rail tensile members coupled with the driving device and the second operable rail, and
a second-rail tension detector coupled with the distance detection circuit for detecting whether the set of second-rail tensile members is loose or taut;
wherein while the second operable rail is being moved to the calculated position, the set of second-rail tensile members remains taut.

11. The motorized window treatment of claim 8, wherein the first operable rail is not substantially moved when the second operable rail is being moved to the calculated position.

12. The motorized window treatment of claim 8, wherein the motor control circuit is configured to determine that the calculated position according to at least one of a moving speed of the second operable rail and a relative position between the second operable rail and a reference surface position.

13. The motorized window treatment of claim 8, wherein when the first operable rail and the second operable rail are moved to a vicinity of the target position, a third rail distance between the first operable rail and the second operable rail is less than or equal to the second rail distance between the first operable rail and the second operable rail.

* * * * *